(12) United States Patent
Lee et al.

(10) Patent No.: US 12,476,348 B2
(45) Date of Patent: Nov. 18, 2025

(54) ELECTRONIC DEVICE, OPERATION METHOD OF ELECTRONIC DEVICE, AND FOLDABLE ELECTRONIC DEVICE

(71) Applicant: SAMSUNG ELECTRONICS CO., LTD., Suwon-si (KR)

(72) Inventors: Dongsub Lee, Suwon-si (KR); Hyosuk Yoo, Suwon-si (KR); Woojong Jo, Suwon-si (KR); Byungjoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/214,781

(22) Filed: Jun. 27, 2023

(65) Prior Publication Data
US 2023/0344112 A1 Oct. 26, 2023

Related U.S. Application Data

(63) Continuation of application No. PCT/KR2021/018845, filed on Dec. 13, 2021.

(30) Foreign Application Priority Data

Jan. 28, 2021 (KR) .................. 10-2021-0012303

(51) Int. Cl.
*H01Q 1/24* (2006.01)
*H01Q 21/00* (2006.01)
(Continued)

(52) U.S. Cl.
CPC ......... *H01Q 1/243* (2013.01); *H01Q 21/0025* (2013.01); *H01Q 23/00* (2013.01); *H04B 7/06966* (2023.05)

(58) Field of Classification Search
CPC .... H01Q 1/243; H01Q 21/0025; H01Q 23/00; H01Q 1/521; H01Q 1/38; H04B 7/06966;
(Continued)

(56) References Cited

U.S. PATENT DOCUMENTS 8,774,859 B2 7/2014 Roh
9,107,240 B2 8/2015 Lee
(Continued)

FOREIGN PATENT DOCUMENTS

KR 10-2005-0060509 A 6/2005
KR 10-2012-0013138 A 2/2012
(Continued)

OTHER PUBLICATIONS

Communication dated Mar. 24, 2022, issued by the International Searching Authority in counterpart International Application No. PCT/KR2021/018845 (PCT/ISA/210).
(Continued)

*Primary Examiner* — Renan Luque
(74) *Attorney, Agent, or Firm* — Sughrue Mion, PLLC

(57) ABSTRACT

An electronic device includes a first antenna; a second antenna; a first front-end module configured to process a signal transmitted through the first antenna or the second antenna and process a signal received through the first antenna; a second front-end module configured to process a signal received through the second antenna; a first switch configured to connect the first front-end module to one of the first antenna or a first path; a second switch configured to connect the second antenna to one of the second front-end module or the first path; and a processor configured to, based on a communication signal being transmitted through the first antenna, control the first switch and the second switch to connect the first antenna to the first front-end module and connect the second antenna to the first path.

15 Claims, 22 Drawing Sheets

(51) Int. Cl.
  *H01Q 23/00* (2006.01)
  *H04B 7/06* (2006.01)
(58) Field of Classification Search
  CPC . H04B 1/04; H04B 1/401; H04B 1/50; H04B 1/0458; G06F 1/16; G06F 1/1616
  See application file for complete search history.

(56) References Cited

U.S. PATENT DOCUMENTS

| | | | |
|---|---|---|---|
| 9,356,663 | B2 | 5/2016 | Seo et al. |
| 10,403,955 | B2 | 9/2019 | Srirattana et al. |
| 10,403,977 | B2 | 9/2019 | Chen et al. |
| 10,554,232 | B2 | 2/2020 | Khlat et al. |
| 10,608,691 | B1 | 3/2020 | Zheng et al. |
| 10,673,470 | B2 | 6/2020 | Lee et al. |
| 10,840,951 | B2 | 11/2020 | Bauder |
| 10,854,956 | B2 | 12/2020 | Son et al. |
| 11,171,407 | B2 | 11/2021 | Jung |
| 11,206,066 | B2 | 12/2021 | Kim et al. |
| 11,451,198 | B2 | 9/2022 | Yoshimi |
| 2012/0009886 | A1* | 1/2012 | Poulin .................. H04B 1/0064 455/78 |
| 2019/0007072 | A1* | 1/2019 | Yuan ..................... H04W 88/06 |
| 2019/0386688 | A1 | 12/2019 | Choi |
| 2020/0366323 | A1* | 11/2020 | Tsuda .................. H04B 1/0078 |

FOREIGN PATENT DOCUMENTS

| | | |
|---|---|---|
| KR | 10-1523223 B1 | 5/2015 |
| KR | 10-1888852 B1 | 9/2018 |
| KR | 10-2019-0017138 A | 2/2019 |
| KR | 10-2020-0117203 A | 10/2020 |

OTHER PUBLICATIONS

Communication dated Mar. 24, 2022, issued by the International Searching Authority in counterpart International Application No. PCT/KR2021/018845 (PCT/ISA/237).
Communication dated Apr. 16, 2025, issued by the Korean Patent Office in Korean Application No. 10-2021-0012303.

* cited by examiner

ELECTRONIC DEVICE, OPERATION METHOD OF ELECTRONIC DEVICE, AND FOLDABLE ELECTRONIC DEVICE

CROSS-REFERENCE TO RELATED APPLICATIONS

This application is a bypass continuation application of International Application No. PCT/KR2021/018845, filed on Dec. 13, 2021, which claims priority to Korean Patent Application No. 10-2021-0012303, filed on Jan. 28, 2021, in the Korean Intellectual Property Office, the disclosures of which are incorporated by reference herein in their entireties.

BACKGROUND

1. Field

The disclosure relates to an electronic device, a foldable electronic device, and an operation method of the electronic device for reducing radiated spurious emission (RSE) caused by coupling between antennas.

2. Description of Related Art

An electronic device may be equipped with an antenna for wireless communication. The antenna used for wireless communication has a function of transmitting or receiving a radio communication signal of a particular frequency band. The antenna may uniformly emit the signal in all directions to prevent deterioration of the transmission or reception function from propagation loss due to, e.g., an obstacle.

Various foldable electronic devices are being developed these days by applying new form-factors to the electronic device. Antennas for wireless communication are highly concentrated in the foldable electronic device by nature.

As for an electronic device in which antennas for wireless communication are densely located, coupling between antennas may increase. Due to the coupling between antennas, a transmission signal may be induced toward an unwanted receiving path, thereby causing radiated spurious emission (RSE) that passes a normal level.

SUMMARY

Provided is an electronic device that may reduce the RSE caused by coupling between antennas that are densely placed. Specifically, when transmitting a communication signal through an antenna, the electronic device may change the receiving path of the receive antenna to eliminate an unnecessary signal induced to another antenna.

Additional aspects will be set forth in part in the description which follows and, in part, will be apparent from the description, or may be learned by practice of the presented embodiments.

According to an aspect of the disclosure, an electronic device includes: a first antenna; a second antenna; a first front-end module configured to process a signal transmitted through the first antenna or the second antenna and process a signal received through the first antenna; a second front-end module configured to process a signal received through the second antenna; a first switch configured to connect the first front-end module to one of the first antenna or a first path; a second switch configured to connect the second antenna to one of the second front-end module or the first path; and a processor configured to, based on a communication signal being transmitted through the first antenna, control the first switch and the second switch to connect the first antenna to the first front-end module and connect the second antenna to the first path.

The processor may be further configured to, based on the communication signal not being transmitted through the first antenna, control the second switch to connect the second antenna to the second front-end module.

The electronic device may further include: a third antenna; a third front-end module configured to process a signal received through the third antenna; and a third switch configured to connect the third antenna to one of the third front-end module or a second path, the first switch is configured to connect the first front-end module to one of the first antenna, the first path or the second path, and the processor may be further configured to, based on the communication signal being through the first antenna, control the third switch to connect the third antenna to the second path.

The processor may be further configured to, based on a sounding reference signal (SRS) being transmitted through the second antenna, control the third switch to connect the third antenna to the second path.

The first switch may be further selectively connected to the first front-end module, a first matching circuit and a second matching circuit to the first antenna, the first path and the second path, and the processor may be further configured to, based on the communication signal being through the first antenna, control the first switch to connect the first path to the first matching circuit and connect the second path to the second matching circuit.

The first matching circuit and the second matching circuit may be configured to have different impedance values.

The communication signal may include an uplink signal in a frequency division duplexing (FDD) scheme, the electronic device may further include: a third antenna configured to receive a downlink signal corresponding to the uplink signal; a third front-end module configured to process the downlink signal received through the third antenna; and a third switch configured to connect the third antenna to one of the third front-end module or a second path, the first switch may be configured to connect the first front-end module to one of the first antenna, the first path or the second path, and the processor may be further configured, based on the communication signal being transmitted through the first antenna, control the third switch to connect the third antenna to the third front-end module.

The first switch may be further configured to, based on the first front-end module being connected to the first antenna, connect the first path to a matching circuit having a preset impedance value.

According to an aspect of the disclosure, an operation method of an electronic device including a first antenna, a second antenna, a first front-end module configured to process a signal transmitted through the first antenna or the second antenna and process a signal received through the first antenna, a second front-end module configured to process a signal received through the second antenna, a first switch configured to connect the first front-end module to one of the first antenna or a first path, and a second switch configured to connect the second antenna to one of the second front-end module or the first path, the operation method including: controlling the first switch to connect the first front-end module to the first antenna; transmitting a communication signal through the first antenna; and based on the communication signal being transmitted through the first antenna, controlling the second switch to connect the second antenna to the first path.

The operation method may further include, based on the communication signal not being transmitted through the first antenna, controlling the second switch to connect the second antenna to the second front-end module.

The electronic device may further include a third antenna, a third front-end module configured to process a signal received through the third antenna, and a third switch configured to connect the third antenna to one of the third front-end module or a second path, and the operation method may further include, based on the communication signal being transmitted through the first antenna, controlling the third switch to connect the third antenna to the second path.

The operation method may further include, based on a sounding reference signal (SRS) being transmitted through the second antenna, controlling the third switch to connect the third antenna to the second path.

The operation method may further include, based on the communication signal being transmitted through the first antenna, controlling the first switch to connect the first path to a first matching circuit and connect the second path to a second matching circuit.

The first matching circuit and the second matching circuit may be configured to have different impedance values.

The communication signal may include an uplink signal in a frequency division duplexing (FDD) scheme, the electronic device may further include a third antenna configured to receive a downlink signal corresponding to the uplink signal, a third front-end module configured to process the downlink signal received through the third antenna, and a third switch configured to connect the third antenna to one of the third front-end module or a second path, and the operation method of the electronic device may further include, based on the communication signal being transmitted through the first antenna, controlling the third switch to connect the third antenna to the third front-end module.

According to one or more embodiments of the disclosure, an electronic device may improve radiated spurious emission (RSE) by eliminating a signal induced to an antenna.

According to one or more embodiments of the disclosure, an electronic device may eliminate a signal induced to an antenna in an optimal matching condition.

According to one or more embodiments of the disclosure, a foldable electronic device may improve RSE with optimal efficiency based on the folding angle.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
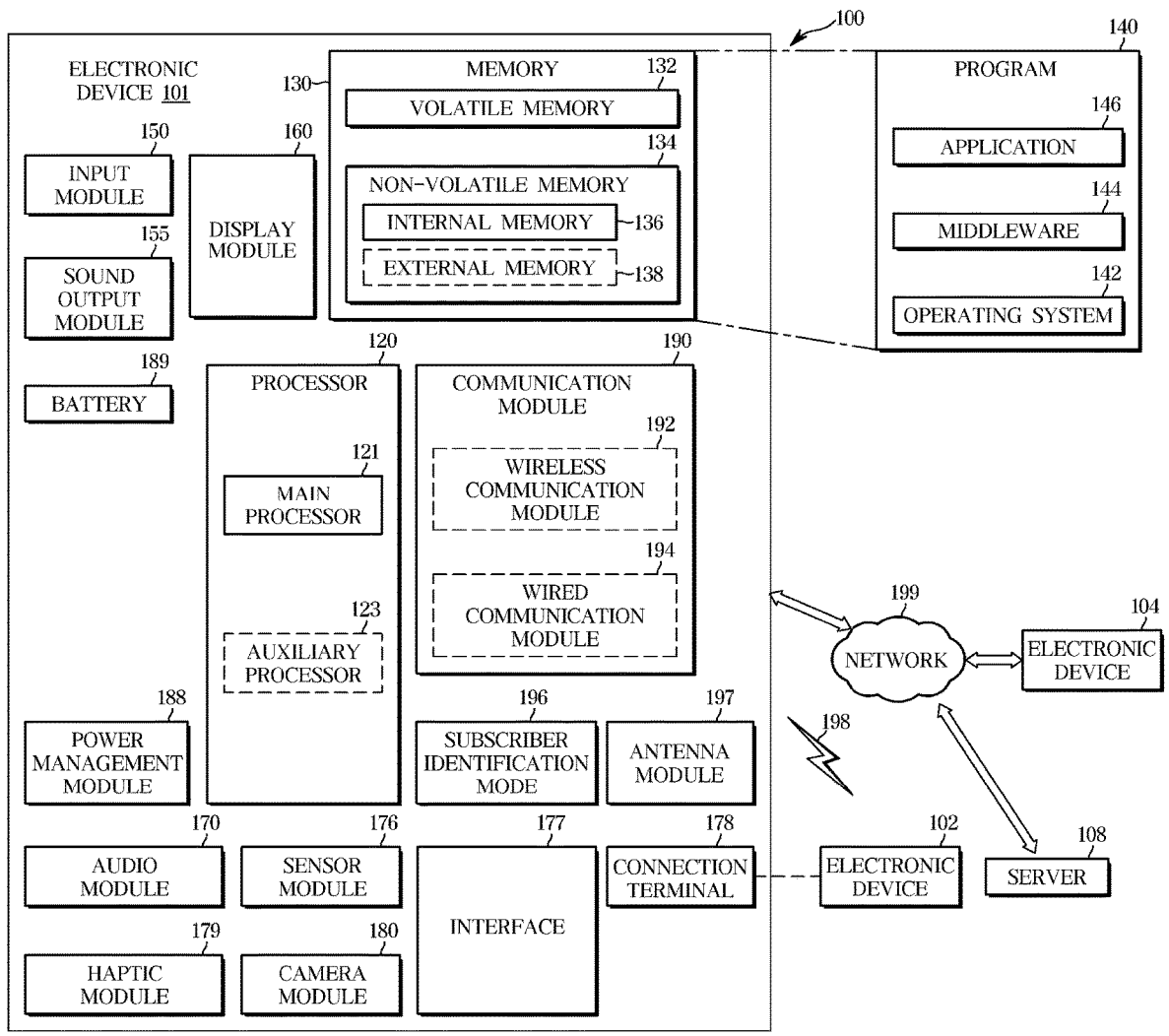
FIG. 1 is a block diagram of an electronic device in a network environment, according to one or more embodiments.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art are to recognize that various changes and modifications of the embodiments described herein can be made without departing from the scope and spirit of the disclosure. In addition, descriptions of well-known functions and structures are omitted for clarity and conciseness.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Embodiments of the disclosure will be described in detail below with reference to the accompanying drawings. Identical or like reference numerals in the drawings denote identical or like component elements.

FIG. 1 is a block diagram of an electronic device 101 in a network environment 100, according to one or more embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196 or an antenna module 197. In an embodiment, at least one of the components (e.g., the connection terminal 178) may be omitted or one or more other components may be added to the electronic device 101. In an embodiment, some of the components (e.g., the sensor module 176, the camera module 180 or the antenna module 197) may be integrated into one component (e.g., the display module 160).

For example, the processor 120 may execute software (e.g., a program 140) to control at least one other component (e.g., hardware or software component) of the electronic device 101 and perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resultant data in a non-volatile memory 134. In an embodiment, the processor 120 may include a main processor 121 (e.g., a central processing unit or an application processor) or an auxiliary processor 123 operable independently or together (e.g., a graphic processing unit, a neural processing unit (NPU), an image signal processor, a sensor hub processor, or a communication processor). For example, when the electronic device 101 includes the main processor 121 and the auxiliary processor 123, the auxiliary processor 123 may be configured to use lower power than the main processor 121 or specialize in a dedicated function. The auxiliary processor 123 may be implemented as separate from, or part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related thereto. In an embodiment, the auxiliary processor 123 (e.g., an NPU) may include a hardware structure specialized in processing an artificial intelligence (AI) model. The AI model may be created by machine learning. Such learning may be performed by e.g., the electronic device 101 itself that performs the AI model, or may be performed by a separate server (e.g., the server 108). A learning algorithm may include e.g., supervised learning, unsupervised learning, semi-supervised learning, or reinforcement learning, without being limited thereto. The AI model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of them, without being limited thereto. Additionally, or alternatively, the AI model may include a software structure in addition to the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system 142, middleware 144, or an application 146.

The input module 150 may receive a command or data to be used by a component (e.g., the processor 140) of the electronic device 101 from outside (e.g., a user) of the electronic device 101. The input module 150 may include, for example, a microphone, a mouse, a keyboard, a key (or button), or a digital pen (e.g., a stylus pen).

The sound output module 155 may output a sound signal to the outside of the electronic device 101. The sound output module 155 may include e.g., a speaker or a receiver. The speaker may be used for general purposes such as multimedia playback or transcription playback. The receiver may be used to receive incoming calls. In an embodiment, the receiver may be implemented as separate from, or part of the speaker.

The display module 160 may visually provide information to the outside (e.g., a user) of the electronic device 101. The display module 160 may include e.g., a display, a hologram device or a projector and a control circuit for controlling the device. In an embodiment, the display module 160 may include a touch sensor configured to detect a touch or a pressure sensor configured to measure intensity of force generated by the touch.

The audio module 170 may convert a sound to an electrical signal, or vice versa. In an embodiment, the audio module 170 may obtain a sound through the input module 150, or output a sound through the sound output module 155 or an external electronic device (e.g., the electronic device 102) (e.g., a speaker or a headphone) connected directly or wirelessly to the electronic device 101.

The sensor module 176 may detect an operation condition (e.g., power or temperature) of the electronic device 101 or an external environment condition (e.g., a user condition), and create an electric signal or a data value corresponding to the detected condition. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols to be used by the electronic device 101 to directly or wirelessly connect to an external electronic device (e.g., the electronic device 102). In an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected to the external electronic device (e.g., the electronic device 102). In an embodiment, the connection terminal 178 may include, for example, an HDMI connector, a USB connector, a SD card connector, or an audio connector (e.g., a headphone connector).

The haptic module 179 may convert an electric signal into a mechanical stimulus (e.g., a vibration or motion) or electrical stimulus which may be recognized by a user via his tactile sensation or kinesthetic sensation. In an embodiment, the haptic module 179 may include, for example, a motor, a piezoelectric element, or an electric stimulator.

The camera module 180 may capture a still image and a moving image. In an embodiment, the camera module 180 may include one or more lenses, image sensors, image signal processors, or flashes.

The power management module 188 may manage electrical power supplied to the electronic device 101. In an embodiment, the power management module 188 may be implemented as e.g., at least part of a power management integrated circuit (PMIC).

The battery 189 may supply power to at least one component of the electronic device 101. In an embodiment, the battery 189 may include, for example, a primary cell which is not rechargeable, a secondary cell which is rechargeable, or a fuel cell.

The communication module 190 may support establishment of a direct (e.g., wired) communication channel or a wireless communication channel between the electronic device 101 and an external electronic device (e.g., the electronic device 102, the electronic device 104, or the server 108), and communication through the established communication channel. The communication module 190 may include one or more communication processors operated separately from the processor 120 (e.g., an application processor) and supporting direct (e.g., wired) communication or wireless communication. In an embodiment, the communication module 190 may include a wireless communication module 192 (e.g., a cellular communication module, a short-range wireless communication module or a global navigation satellite system (GNSS) communication module) or a wired communication module 194 (e.g., a local area network (LAN) communication module or a power-line communication module). A corresponding one of the communication modules may communicate with an external electronic device 104 over the first network 198 (e.g., a short-range communication network such as bluetooth, wireless-fidelity (Wi-Fi) direct or infrared data association (IrDA)) or the second network 199 (e.g., a remote communication network such as a legacy cellular network, a fifth generation (5G) network, a next generation communication network, the Internet, or a computer network (e.g., a LAN or wide area network (WAN)). These various types of communication modules may be integrated into a single component (e.g., a single chip) or implemented as a plurality of separate components (e.g., a plurality of chips). The wireless communication module 192 may use subscriber information (e.g., international mobile subscriber identity (IMSI)) stored in the subscriber identification module 196 to authorize or authenticate the electronic device 101 in the communication network such as the first network 198 or the second network 199.

The wireless communication module 192 may support a 5G network after the 4G network and a next generation communication technology, e.g., a new radio (NR) access technology. The NR access technology may support high-speed transfer of high-volume data (enhanced mobile broadband (eMBB)), minimization of UE power and access of multiple UEs (massive machine type communication (mMTC)), or high reliability and low latency (ultra-reliable and low-latency communication (URLLC)). The wireless communication module 192 may support, e.g., high-frequency band (e.g., mmWave band) to attain a high data transfer rate. The wireless communication module 192 may support various technologies to guarantee performance in the high-frequency band, e.g., beamforming, massive multiple-input and multiple-output (MIMO), full dimensional MIMO (FD-MIMO), array antenna, analog beamforming, or large-scale antenna. The wireless communication module 192 may support various requirements prescribed for the electronic device 101, an external electronic device (e.g., the electronic device 104) or a network system (e.g., the second network 199). In an embodiment, the wireless communication module 192 may support a peak data rate for fulfilling eMBB (e.g., 20 Gbps or higher), loss coverage for fulfilling mMTC (e.g., 164 dB or less), or user plane (U-plane) latency for fulfilling URLLC (e.g., 0.5 ms or less for DL and UL or 1 ms or less for round trip).

The antenna module 197 may transmit or receive a signal or power to or from the outside (e.g., to an external electronic device). In an embodiment, the antenna module 197 may include an antenna including a conductor or a radiator formed in a conductive pattern formed on a substrate (e.g., a printed circuit board (PCB)). In an embodiment, the antenna module 197 may include a plurality of antennas (e.g., array antennas). In this case, at least one antenna suitable for a communication scheme used in a communication network, such as the first network 198 or the second network 199, may be selected, for example, by the communication module 190 from among the plurality of antennas. The signal or power may be transmitted or received between the communication module 190 and the external electronic device through the at least one selected antenna. In an embodiment, a component (e.g., a radio frequency integrated circuit (RFIC)) other than the radiator may be additionally formed as part of the antenna module 197.

In one or more embodiments, the antenna module 197 may form an mmWave antenna module. In an embodiment, the mmWave antenna module may include a PCB, an RFIC arranged on or adjacent to a first surface (e.g., the lower surface) of the PCB to support a designated high-frequency band (e.g., mmwave band), and a plurality of antennas (e.g., array antennas) arranged on or adjacent to a second surface (e.g., the upper surface or side surface) of the PCB to transmit or receive a signal in the designated high-frequency band.

At least some of the components may be interconnected in an inter-peripheral communication method (e.g., a bus, a general-purpose input and output (GPIO), a serial peripheral interface (SPI), or a mobile industry processor interface (MIPI)) to exchange a signal (command or data) with one another.

In an embodiment, the command or data may be transmitted or received between the electronic device 101 and the external electronic device 104 through the server 108 connected to the second network 199. Each of the external electronic devices 102 or 104 may be a device of a same type as or a different type from the electronic device 101. In an embodiment, all or part of operations executed in the electronic device 101 may be executed in one or more of the external electronic devices 102, 104 or 108. For example, when the electronic device 101 needs to perform a function or service automatically or in response to a request from the user or another device, the electronic device 101 may request one or more of external electronic devices to perform the at least part of the function or service instead of or in addition to executing the function or service by itself. The one or more external electronic devices receiving the request may perform the at least part of the function or the service requested, or an additional function or service related to the request and send an outcome of the performing to the electronic device 101. The electronic device 101 may process the outcome as it is or in addition, and provide the result as part of a response to the request. For this, for example, cloud computing, distributed computing, mobile edge computing (MEC), or client-server computing technologies may be used. The electronic device 101 may use e.g., the distributed computing or mobile edge computing to provide an ultra-low-latency service. In another embodiment, the external electronic device 104 may include an Internet of things (IoT) device. The server 108 may be an intelligent server that uses machine learning and/or a neural network. In an embodiment, the external electronic device 104 or the server 108 may be included in the second network 199. The electronic device 101 may be applied for intelligent services (e.g., smart home, smart city, smart car, or health care) based on the 5G communication technology and the IoT related technology.

FIGS. 2A to 4B are diagrams illustrate states and structures of an electronic device, according to one or more embodiments.

Figure 2A:
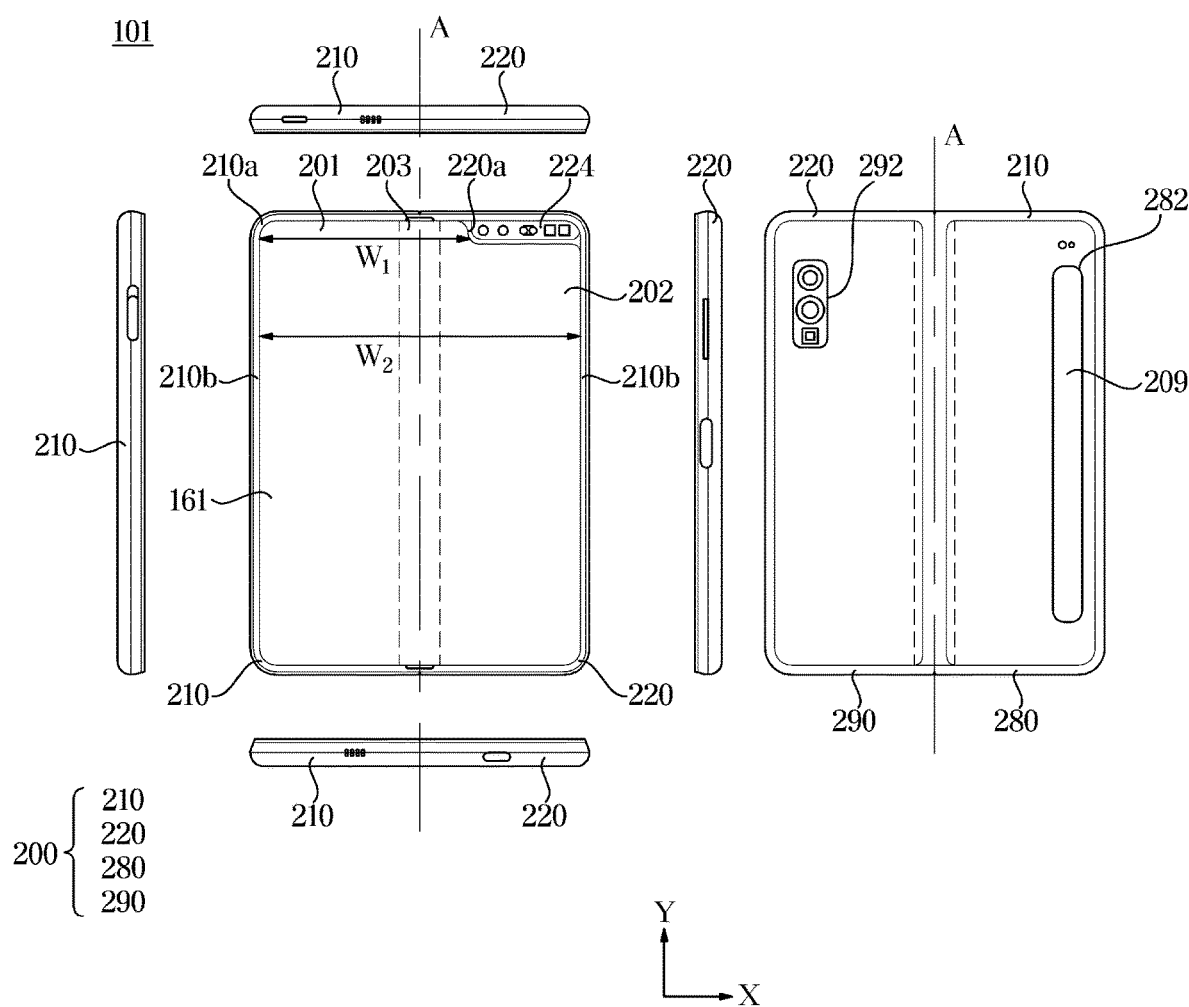
FIG. 2A illustrates an unfolded state of an electronic device, according to one or more embodiment.
Figure 2B:
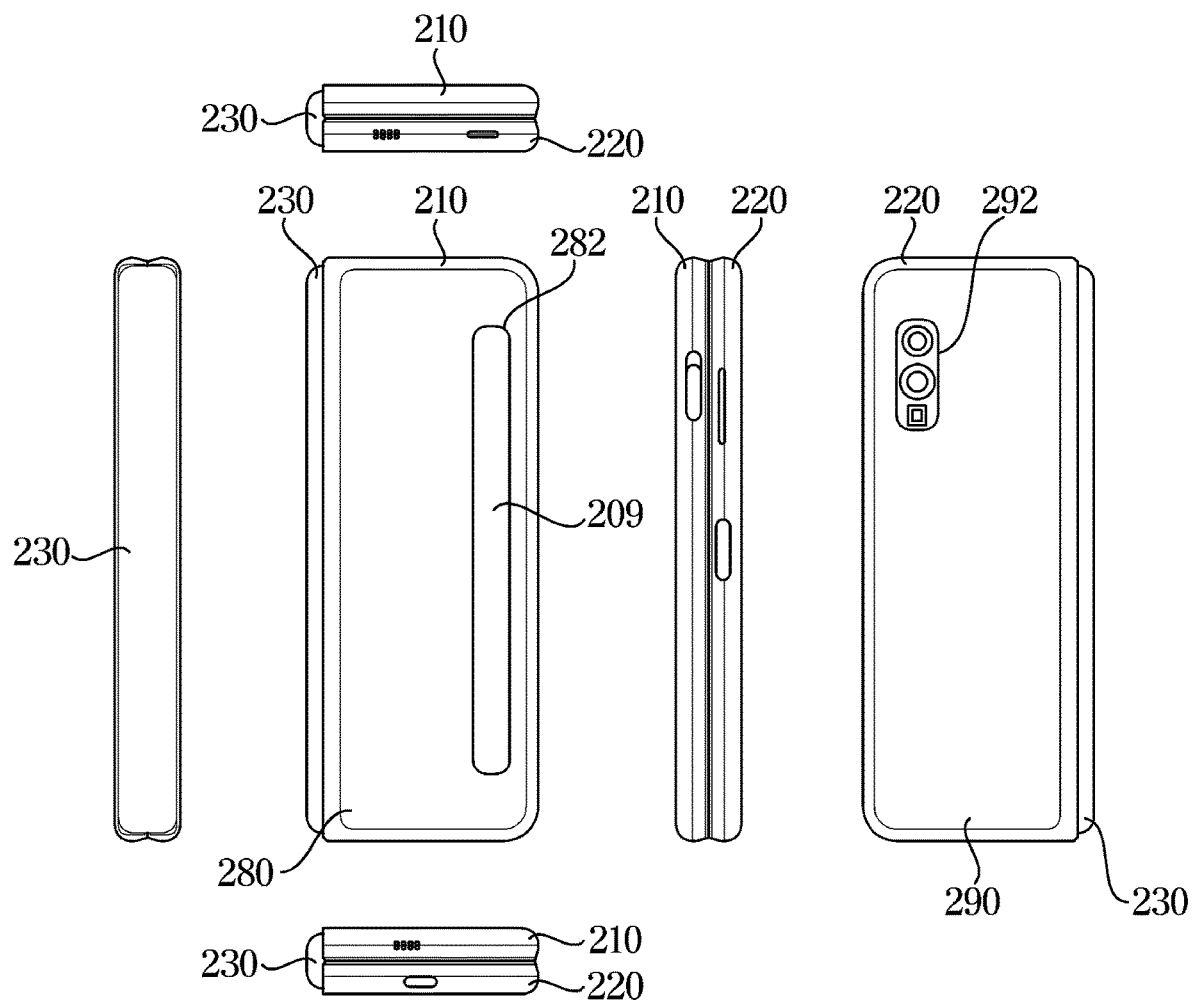
FIG. 2B illustrates a folded state of an electronic device, according to one or more embodiments.

Referring to FIGS. 2A and 2B, in an embodiment, the electronic device 101 may include a foldable housing 200, a hinge cover 230 covering a foldable portion of the foldable housing 200, and a flexible or foldable display 161 (hereinafter, referred to as a 'display' 161) arranged in a space formed by the foldable housing 200. In the specification, a surface on which the display 161 is arranged is defined as a first surface or a front surface of the electronic device 101. The opposite surface of the front surface is defined as a second surface or a rear surface of the electronic device 101. A surface surrounding the space between the front surface and the rear surface is defined as a third surface or side surface of the electronic device 101.

In an embodiment, the foldable housing 200 may include a first housing structure 210, a second housing structure 220 including a sensor region 224, a first rear cover 280, and a second rear cover 290. The foldable housing 200 of the electronic device 101 is not limited to the form and combination as shown in FIGS. 2A and 2B and may be implemented by a combination of other forms or components. For example, in another embodiment, the first housing structure 210 and the first rear cover 280 may be integrally formed, and the second housing structure 220 and the second rear cover 290 may be integrally formed.

Referring to FIG. 2A, the first housing structure 210 and the second housing structure 220 may be arranged on either side of a folding axis (axis A) and may have a symmetrical shape altogether with respect to the folding axis A. As described above, the first housing structure 210 and the second housing structure 220 may form a different angle or distance depending on whether the electronic device 101 is in the unfolded state, folded state or intermediate state. In the embodiment shown, the second housing structure 220 additionally includes the sensor region 224 having various sensors arranged therein unlike the first housing structure 210, but may have a symmetrical shape in the other areas.

In an embodiment, as shown in FIG. 2A, the first housing structure 210 and the second housing structure 220 may form a recess together that receives the display 161. Further, the recess may have two or more different widths in a direction perpendicular to the folding axis A, due to the sensor region 114.

For example, the recess may have (1) a first width w1 between a first portion 210*a* of the first housing structure 210, that is parallel to the folding axis A, and a first portion 220*a* of the second housing structure 220, that is formed on an edge of the sensor region 224, and (2) a second width w2 formed by a second portion 210*b* of the first housing structure 210 and a second portion 210*b* of the second housing structure 220, that does not include the sensor region 224 but is parallel to the folding axis A. In this case, the second width w2 may be formed to be longer than the first width w1. In other words, the first portion 210*a* of the first housing structure 210 and the first portion 220*a* of the second housing structure 220 together having an asymmetric form may form the first width w1 of the recess, and the second portion 210*b* of the first housing structure 210 and the second portion 210*b* of the second housing structure 220 together having a symmetric form may form the second width w2 of the recess. In an embodiment, the first portion 220*a* and the second portion 210*b* of the second housing structure 220 may have different distances from the folding axis A. The widths of the recess are not limited to the example shown. In one or more embodiments, the recess may have a plurality of widths due to the shape of the sensor region 224 or the asymmetrical portion of the first and second housing structures 210 and 220.

In an embodiment, at least a portion of the first housing structure 210 and the second housing structure 220 may be formed of a metal or non-metal substance having a selected level of rigidity to support the display 161.

In an embodiment, the sensor region 224 may be formed to have a certain area by being close to a corner of the second housing structure 220. The layout, shape and size of the sensor region 224 are not, however, limited to the example shown. For example, in another embodiment, the sensor region 224 may be provided in an arbitrary region between another corner or the top corner and the bottom corner of the second housing structure 220. In an embodiment, components for performing various functions built into the electronic device 101 may be exposed to the front surface of the electronic device 101 through the sensor region 224 or one or more openings formed in the sensor region 224. In one or more embodiments, the components may include various types of sensors. The sensor may include, for example, at least one of a front camera, a receiver or a proximity sensor.

The first rear cover 280 may be placed on one side to the folding axis on the rear surface of the electronic device, and for example, may have a substantially rectangular periphery, which may be enclosed by the first housing structure 210. Similarly, the second rear cover 290 may be arranged on the other side to the folding axis on the rear surface of the electronic device, and the periphery may be enclosed by the second housing structure 220.

In the embodiment shown, the first rear cover 280 and the second rear cover 290 may have a substantially symmetrical shape centered on the folding axis (axis A). However, the first rear cover 280 and the second rear cover 290 do not need to have a symmetrical shape, and in another embodiment, the electronic device 101 may include various shapes of the first rear cover 280 and second rear cover 290. In another embodiment, the first rear cover 280 may be integrally formed with the first housing structure 210, and the second rear cover 290 may be integrally formed with the second housing structure 220.

In an embodiment, the first rear cover 280, the second rear cover 290, the first housing structure 210 and the second housing structure 220 may form a space where various components (e.g., a PCB or a battery) of the electronic device 101 may be placed. In an embodiment, one or more components may be arranged on or visually exposed to the rear surface of the electronic device 101. For example, at least a portion of a sub-display 209 may be visually exposed through a first rear surface area 282 of the first rear cover 280. In another embodiment, one or more components or sensors may be visually exposed through a second rear surface area 292 of the second rear cover 290. In one or more embodiments, the sensor may include a proximity sensor and/or a rear facing camera.

Referring to FIG. 2B, the hinge cover 230 may be arranged between the first housing structure 210 and the second housing structure 220 to cover internal components (e.g., a hinge structure). In an embodiment, the hinge cover 230 may be covered by part of the first housing structure 210 and the second housing structure 220 or exposed to the outside depending on the state (flat state or folded state) of the electronic device 101.

For example, as shown in FIG. 2A, when the electronic device 101 is in the flat state, the hinge cover 230 may not be exposed by being covered by the first housing structure 210 and the second housing structure 220. For example, as shown in FIG. 2B, when the electronic device 101 is in the folded state (e.g., fully folded state), the hinge cover 230 may be exposed to the outside between the first housing structure 210 and the second housing structure 220. For example, in an intermediate state in which the first housing structure 210 and the second housing structure 220 are folded with a certain angle, the hinge cover 230 may be partially exposed to the outside between the first housing structure 210 and the second housing structure 220. In this case, however, the exposed area may be smaller than in the fully folded state. In an embodiment, the hinge cover 230 may include a curved surface.

The display 161 may be arranged in the space formed by the foldable housing 200. For example, the display 161 is settled in the recess formed by the foldable housing 200, and may constitute a majority of the front surface of the electronic device 101.

Accordingly, the front surface of the electronic device 101 may include the display 161, and a portion of the first housing structure 210 and a portion of the second housing structure 220, which are adjacent to the display 161. The rear surface of the electronic device 101 may include the first rear cover 280, a portion of the first housing structure 210 adjacent to the first rear cover 280, the second rear cover 290, and a portion of the second housing structure 220 adjacent to the second rear cover 290.

The display 161 may refer to a display, at least a portion of which may be deformed to a flat plane or a curved plane. In an embodiment, the display 161 may include a folding region 203, a first region 201 located on one side to the folding region 203 (on the left to the folding region 203 shown in FIG. 2A), and a second region 202 located on the other side to the folding region 203 (on the right to the folding region 203 shown in FIG. 2A).

Division of the area of the display 161 shown in FIG. 2A is an example, but the display 161 may be divided into multiple (e.g., 4 or more, or 2) regions depending on the structure or function of the display 161. For example, in the embodiment shown in FIG. 2A, the area of the display 161 may be divided based on the folding region 203 or the folding axis (axis A) extending in parallel with the axis Y, but in another embodiment, the display 161 may be divided based on another folding region (e.g., a folding region in parallel with axis X) or another folding axis (e.g., a folding axis in parallel with the axis X).

The first region 201 and the second region 202 may have a symmetrical shape on the whole centered on the folding region 203. The second region 202 may, however, include a notch cut along the presence of the sensor region 224 unlike the first region 201, but may have a symmetrical shape with the first region 201 in the other area. In other words, the first region 201 and the second region 202 together may include a portion of a symmetrical shape and a portion of an asymmetrical shape.

Operations of the first housing structure 210 and the second housing structure 220 and each region of the display 161 will now be described according to the state (e.g., flat state and folded state) of the electronic device 101.

In an embodiment, when the electronic device 101 is in the flat state (e.g., in FIG. 2A), the first housing structure 210 and the second housing structure 220 may form an angle of 180 degrees and may be positioned to face the same direction. The surface of the first region 201 and the surface of the second region 202 of the display 161 may form 180 degrees together, and face the same direction (e.g., forward direction of the electronic device). The folding region 203 may form the same plane with the first region 201 and the second region 202.

In an embodiment, when the electronic device 101 is in the folded state (e.g., in FIG. 2B), the first housing structure 210 and the second housing structure 220 may be positioned to face each other. The surface of the first region 201 and the surface of the second region 202 of the display 161 together may form a narrow angle (e.g., 0 to 10 degrees) and face each other. At least a portion of the folding region 203 may be formed of a curved plane with a certain curvature.

In an embodiment, when the electronic device 101 is in the intermediate state (e.g., in FIG. 2B), the first housing structure 210 and the second housing structure 220 may be positioned at a certain angle to each other. The surface of the first region 201 and the surface of the second region 202 of the display 161 may form an angle larger than in the folded state and smaller than in the flat state. At least a portion of the folding region 203 may be formed of a curved plane having a certain curvature, which may be smaller than in the folded state.

Figure 2C:
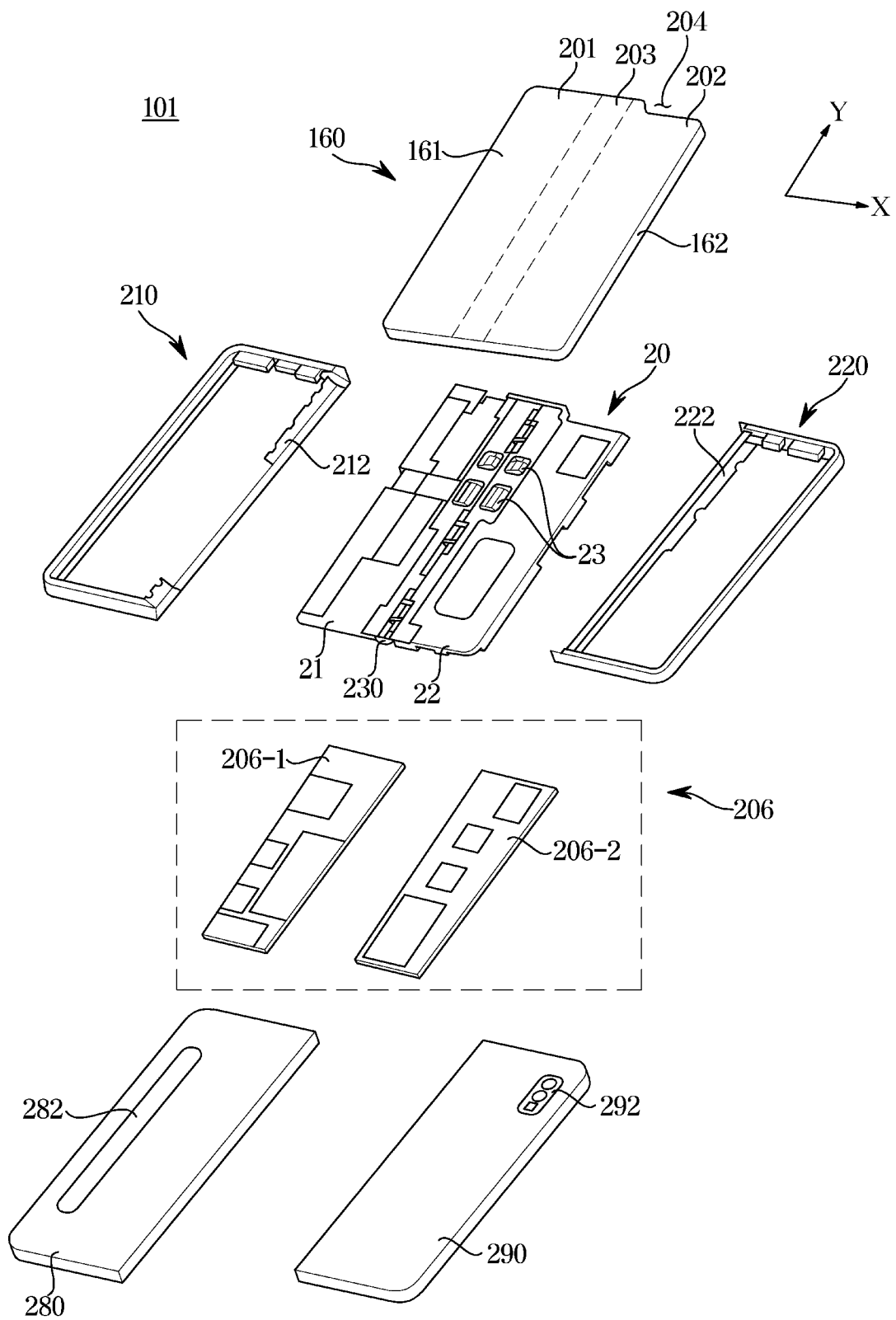
FIG. 2C is an exploded perspective view of an electronic device, according to one or more embodiments.

FIG. 2C is an exploded perspective view of an electronic device, according to an embodiment.

Referring to FIG. 2C, in the embodiment, the electronic device 101 may include the display module 160, a bracket assembly 20, a board 206, the first housing structure 210, the second housing structure 220, the first rear cover 280 and the second rear cover 290. In the specification, the display module 160 may include the display 161 and one or more plates or layers 162 on which the display is settled. In an embodiment, the plate 162 may be placed between the display 161 and the bracket assembly 20. The display 161 may be arranged in at least a portion of one surface (the upper surface based on FIG. 2C) of the plate 162. The plate 162 may be formed in a shape that matches the display 161. For example, a portion of the plate 162 may be formed in a shape corresponding to a notch 204 of the display 161.

The bracket assembly 20 may include a first bracket 21, a second bracket 22, a hinge mechanism arranged between the first bracket 21 and the second bracket 22, the hinge cover 230 covering the hinge mechanism when viewed from outside, and a wiring member 23 traversing the first bracket 21 and the second bracket 22 (e.g., a flexible printed circuit (FPC)).

In an embodiment, the bracket assembly 20 may be placed between the plate 162 and the board 206. For example, the first bracket 21 may be placed between the first region 201 of the display 161 and a first board 206-1. The second bracket 22 may be placed between the second region 202 of the display 161 and a second board 206-2.

In an embodiment, the wiring member 23 and at least a portion of the hinge mechanism may be arranged in the bracket assembly 20. The wiring member 23 may be arranged in a direction (e.g., along the axis X) traversing the first bracket 21 and the second bracket 22. The wiring member 23 may be arranged in a direction perpendicular to a folding axis (e.g., the axis Y or the folding axis A of FIG. 2A) of the folding region 203 of the electronic device 101.

The board 206 may include, as mentioned above, the first board 206-1 arranged on the side of the first bracket 21 and the second board 206-2 arranged on the side of the second bracket 22. The first substrate 206-1 and the second substrate 206-2 may be arranged in a space formed by the bracket assembly 20, the first housing structure 210, the second housing structure 220, the first rear cover 280 and the second rear cover 290. Components for implementing various functions of the electronic device 101 may be mounted on the first board 206-1 and the second board 206-2.

The first housing structure 210 and the second housing structure 220 may be assembled together to be coupled onto either side of the bracket assembly 20 while the display module 160 is coupled with the bracket assembly 20. As described later, the first housing structure 210 and the second housing structure 220 may be coupled with the bracket assembly 20 by sliding from either side of the bracket assembly 20.

In an embodiment, the first housing structure 210 may include a first rotation support plane 212, and the second housing structure 220 may include a second rotation support plane 222 that matches the first rotation support plane 212. The first rotation support plane 212 and the second rotation support plane 222 may include curved planes matching curved planes included in the hinge cover 230.

In an embodiment, when the electronic device 101 is in the flat state (e.g., the electronic device of FIG. 2A), the first rotation support plane 212 and the second rotation support plane 222 may cover the hinge cover 230 to prevent the hinge cover 230 from being exposed to the rear side of the electronic device 101 or to minimize the exposure. On the other hand, when the electronic device 101 is in the folded state (e.g., the electronic device of FIG. 2B), the first rotation support plane 212 and the second rotation support plane 222 may be rotated along the curved plane included in the hinge cover 230 to expose the hinge cover 230 to the rear side of the electronic device 101 to a maximum extent.

Figure 2D:
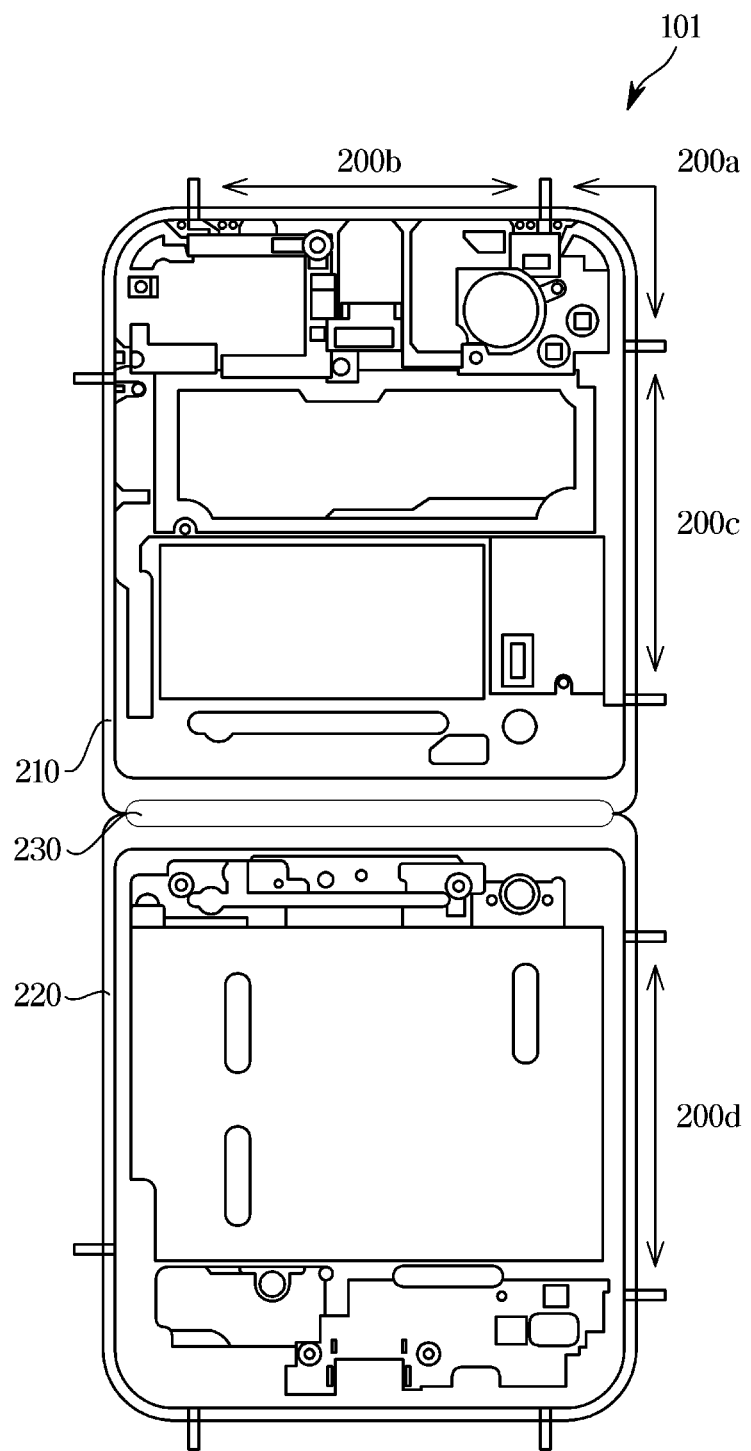
FIG. 2D is a diagram for describing an antenna layout in an electronic device, according to one or more embodiments.

As described above with reference to FIGS. 2A to 2C, the electronic device 101 may be structured to be foldable in a horizontal direction (e.g., a direction perpendicular to the folding axis A of FIG. 2A (e.g., the direction X)), but may be structured to be foldable in a vertical direction (along the folding axis A of FIG. 2A (e.g., the direction Y)) as shown in FIG. 2D in one or more embodiments.

Assume herein that the electronic device 101 is structured to be folded in the vertical direction, for convenience of explanation.

Referring to FIG. 2D, the electronic device 101 in the foldable structure may include the first housing structure, the second housing structure 220 and the hinge cover 230 for covering the hinge mechanism.

In an embodiment, the exterior of the electronic device 101 may be formed of a metal.

In an embodiment, the first housing structure 210 may include a first antenna 200a, a second antenna 200b and a third antenna 200c, and the electronic device 101 may transmit or receive a communication signal through the first antenna 200a arranged in the top corner of the first housing structure 210.

In an embodiment, the second housing structure 220 may include a fourth antenna 200d.

The electronic device 101 may receive a communication signal through the second antenna 200b arranged at an upper end of the first housing structure 210, the third antenna 200c arranged at a side end of the first housing structure 210, and the fourth antenna 200d arranged at a side end of the second housing structure 220.

In an embodiment, the position and number of antennas arranged in the electronic device 101 may be changed without limitation. For example, the first antenna 200a, the second antenna 200b, the third antenna 200c and the fourth antenna 200d may all be arranged in the first housing structure 210.

In an embodiment, the electronic device 101 may receive a communication signal through a plurality of antennas (e.g., the first antenna 200a and the second antenna 200b). By receiving communication signals through a plurality of antennas, the electronic device 101 may have improved reception performance as compared to receiving the communication signal through one antenna.

In an embodiment, the first housing structure 210 and the second housing structure 220 may include a touch screen display (e.g., the display module 160 of FIG. 1) on one side or both sides.

In an embodiment, the hinge cover 230 may be included between the first housing structure 210 and the second housing structure 220 to connect the first housing structure 210 to the second housing structure 220. The hinge mechanism inside the hinge cover 230 may be rotatable and may open or close the second housing structure 220.

In an embodiment, a folding angle between the first housing structure 210 and the second housing structure 220 may be changed according to the user's manipulation.

Figure 3:
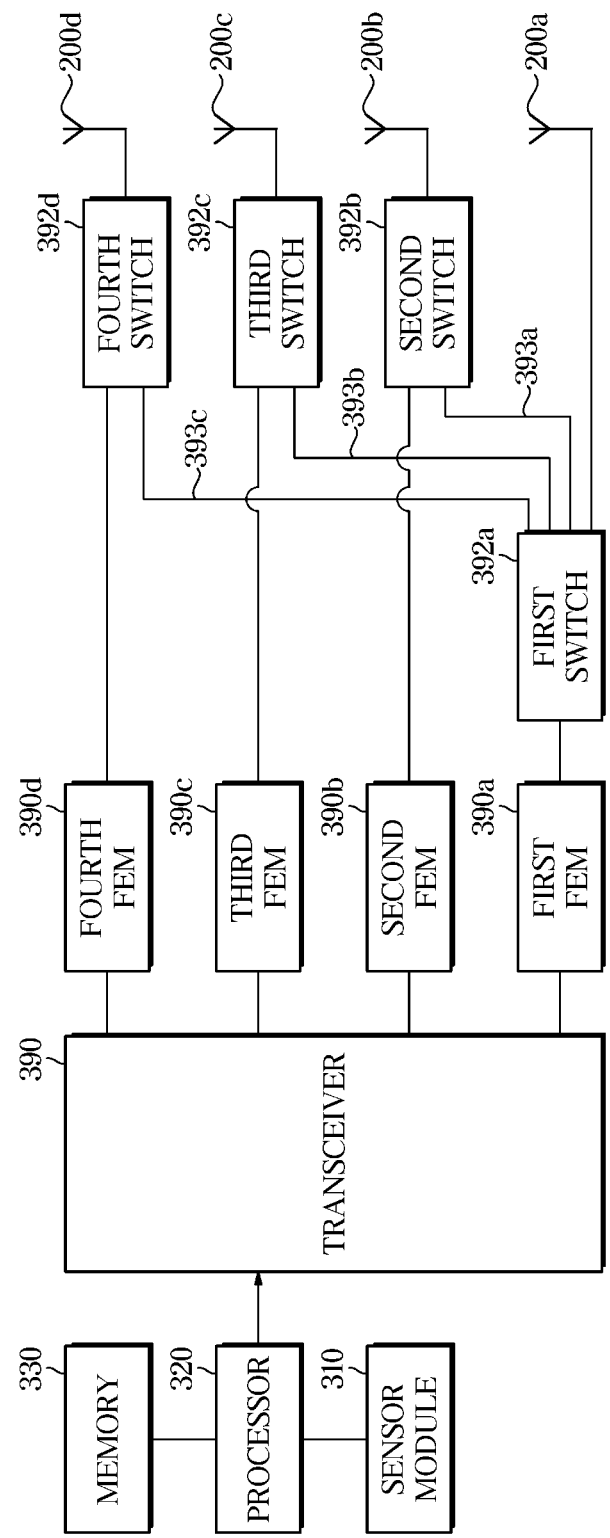
FIG. 3 is an example of a block diagram of a communication module of an electronic device, according to one or more embodiment.

FIG. 3 is an example of a block diagram of a communication module of an electronic device, according to one or more embodiments.

Referring to FIG. 3, in an embodiment, a communication module (e.g., the wireless communication module 192 of FIG. 1) of the electronic device 101 may include a processor 320 (e.g., the auxiliary processor 123 of FIG. 1), a memory 330 (e.g., the memory 130 of FIG. 1), a transceiver 390, a plurality of antennas (e.g., the first antenna 200a, the second antenna 200b, the third antenna 200c, and the fourth antenna 200d of FIG. 2), a plurality of switches (e.g., a first switch 392a, a second switch 392b, a third switch 392c, and a fourth switch 392d), and a plurality of front-end modules (FEMs) (e.g., a first FEM 390a, a second FEM 390b, a third FEM 390c, and a fourth FEM 390d).

In an embodiment, a sensor module 310 (e.g., the sensor module 176 of FIG. 1) may include at least one sensor for detecting the folding angle of the electronic device 101 having the foldable structure.

In an embodiment, the sensor module 310 may use at least one of a proximity sensor, an infrared (IR) sensor, or a luminance sensor to detect the folding angle of the electronic device 101 having the foldable structure. However, the sensor module 310 may employ any sensor that is able to detect the folding angle of the electronic device 101 having the foldable structure, without limitation.

In an embodiment, the sensor module 310 may be embedded in the touch screen display equipped on one or both sides of the first housing structure 210 and/or the second housing structure 220 of the electronic device 101.

Although the sensor module 310 is described as not being included in the communication module (e.g., the communication module 190 of FIG. 1) of the electronic device 101, it is not limited thereto. In an embodiment, the sensor module 310 may be included in the communication module.

The processor 320 may obtain information about the folding angle of the foldable electronic device 101 from the sensor module 310.

The processor 320 may refer to one or more communication processors operated separately from the application processor (e.g., the processor 120 of FIG. 1) and supporting direct (e.g., wired) communication or wireless communication.

In an embodiment, the processor 320 may be operably connected to the transceiver 390 and/or at least one switch (e.g., the first switch 392a, the second switch 392b, the third switch 392c, or the fourth switch 392d) and/or at least one FEM (e.g., the first FEM 390a, the second FEM 390b, the third FEM 390c or the fourth FEM 390d).

The memory 330 may store a transceiver control program for controlling the transceiver 390 and/or a switch control program for controlling the at least one switch (e.g., the first switch 392a, the second switch 392b, the third switch 392c or the fourth switch 392d) and/or an FEM control program for controlling at least one FEM (e.g., the first FEM 390a, the second FEM 390b, the third FEM 390c or the fourth FEM 390d).

In an embodiment, the memory 330 may store a reference value of the folding angle for determining whether the foldable electronic device 101 is in the folded state or unfolded state.

In an embodiment, the processor 320 may control the transceiver 390 to transmit a communication signal through an antenna (e.g., the first antenna 200a), and receive a signal from at least one antenna (e.g., the first antenna 200a, the second antenna 200b, the third antenna 200c or the fourth antenna 200d) through the transceiver 390.

In an embodiment, the transceiver 390 may perform at least one operation of signal modulation/demodulation, frequency conversion and/or analog/digital conversion. For example, the transceiver 390 may modulate a signal received from at least one FEM (e.g., the first FEM 390a, the second FEM 390b, the third FEM 390c or the fourth FEM 390d) to a signal that may be processed by the processor 320 or modulate a signal received from the processor 320 to a signal that may be processed by the at least one FEM (e.g., the first FEM 390a, the second FEM 390b, the third FEM 390c or the fourth FEM 390d), under the control of the processor 320.

In an embodiment, at least one FEM 390a, 390b, 390c or 390d may process a signal received from the transceiver 390 to send the result to the antenna 200a, 200b, 200c or 200d, or process a signal received from the antenna 200a, 200b, 200c or 200d to send the result to the transceiver 390.

In an embodiment, the first FEM 390a may process a signal received from the transceiver 390 to send a communication signal to the at least one antenna (e.g., the first antenna 200a). In an embodiment, the communication signal may refer to a signal for connection for wireless communication between an external electronic device (e.g., the electronic device 102, the electronic device 104 or the server 108) and the electronic device 101. For example, the communication signal may include a signal for connection for wireless communication between the electronic device 101 and a base station (BS). Furthermore, the communication signal may include a sounding reference signal (SRS).

The second FEM 390b, the third FEM 390c and the fourth FEM 390d may process signals received from the second antenna 200b, the third antenna 200c and the fourth antenna 200d, respectively, and send the results to the transceiver 390.

In an embodiment, at least one switch (e.g., the first switch 392a, the second switch 392b, the third switch 392c, or the fourth switch 392d) may be configured to change a receiving path of a signal received from at least one antenna (e.g., the first antenna 200a, the second antenna 200b, the third antenna 200c or the fourth antenna 200d).

In an embodiment, the first switch 392a may connect the first FEM 390a to the first antenna 200a, or the other path (e.g., the first path 393a, the second path 393b, or the third path 393c). For example, the first switch 392a may be implemented as a single-pole quad-throw (SP4T) switch or as a quad-pole quad-throw (4P4T) switch.

In an embodiment, the first path 393a, the second path 393b and the third path 393c may refer to paths connected to the second switch 392b, the third switch 392c and the fourth switch 392d, respectively. For example, the first path 393a may refer to a path between the first switch 392a and the second switch 392b, the second path 393b may refer to a path between the first switch 392a and the third switch 392c, and the third path 393c may refer to a path between the first switch 392a and the fourth switch 392d.

In an embodiment, the second switch 392b may connect the second antenna 200b to one of the second FEM 390b or the first path 393a, the third switch 392c may connect the third antenna 200c to one of the third FEM 390c or the second path 393b, and the fourth switch 392d may connect the fourth antenna 200d to one of the fourth FEM 390d or the third path 393c. For example, the second switch 392b, the third switch 392c, and the fourth switch 392d may be implemented as single pole double throw (SPDT) switches.

In an embodiment, the processor 320 may control at least one switch (e.g., the first switch 392*a*, the second switch 392*b*, the third switch 392*c*, or the fourth switch 392*d*) to change a transmitting path of a signal output from the transceiver 390 or a receiving path of a signal received through at least one antenna (e.g., the first antenna 200*a*, the second antenna 200*b*, the third antenna 200*c* and the fourth antenna 200*d*).

In an embodiment, the processor 320 may control the transceiver 390 and at least one switch (e.g., the first switch 392*a*, the second switch 392*b*, the third switch 392*c* or the fourth switch 392*d*) to transmit an SRS through one antenna (e.g., the second antenna 200*b*) among the plurality of antennas (e.g., the first antenna 200*a*, the second antenna 200*b*, the third antenna 200*c* and the fourth antenna 200*d*).

In an embodiment, the processor 320 may control the first switch 392*a* to connect the first FEM 390*a* sequentially to the plurality of antennas (e.g., the first antenna 200*a*, the second antenna 200*b*, the third antenna 200*c* and the fourth antenna 200*d*), so that the electronic device 101 may transmit the SRS through the plurality of antennas (e.g., the first antenna 200*a*, the second antenna 200*b*, the third antenna 200*c* and the fourth antenna 200*d*).

The SRS refers to a signal transmitted for channel estimation required for MIMO transmission.

In an embodiment, the first antenna 200*a*, the second antenna 200*b*, the third antenna 200*c* and the fourth antenna 200*d* may transmit or receive signals of different frequency bands. Furthermore, at least two of the first antenna 200*a*, the second antenna 200*b*, the third antenna 200*c* and the fourth antenna 200*d* may transmit or receive signals of an overlapping frequency band.

Figure 4A:
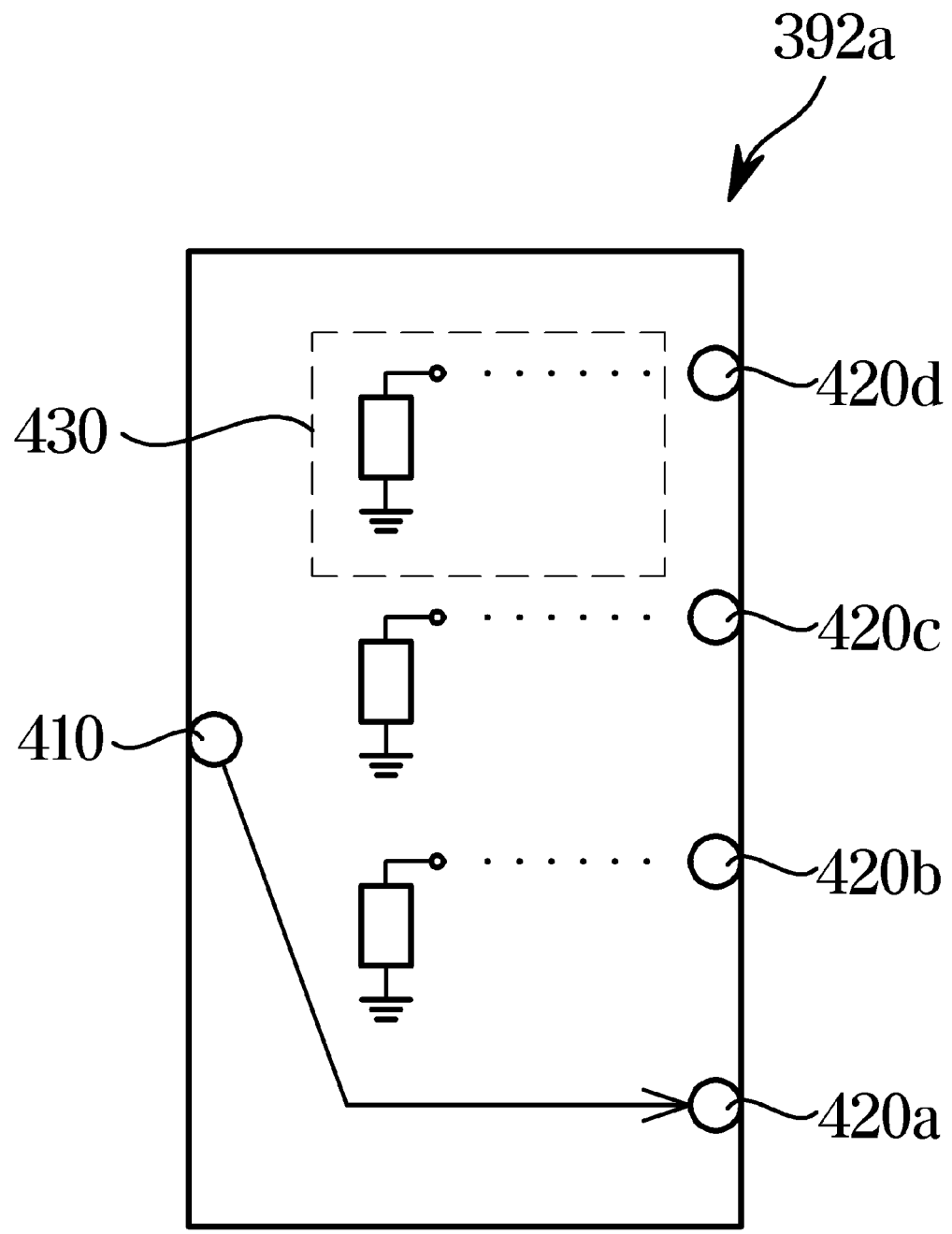
FIG. 4A is an example of a first switch of a communication module of an electronic device, according to various embodiments.

FIG. 4A is an example of a first switch of a communication module of an electronic device, according to one or more embodiments.

Referring to FIG. 4A, in an embodiment, the first switch 392*a* may be implemented as the SP4T switch.

The first switch 392*a* may include one input end 410 and a plurality of output ends (e.g., a first output end 420*a*, a second output end 420*b*, a third output end 420*c* and a fourth output end 420*d*). In an embodiment, the input end 410 may be connected to the first FEM 390*a*; the first output end 420*a* may be connected to the first antenna 200*a*; the second output end 420*b* may be connected to the first path 393*a*; the third output end 420*c* may be connected to the second path 393*b*; and the fourth output end 420*d* may be connected to the third path 393*c*.

The first switch 392*a* may connect the input end 410 to one output end (e.g., the first output end 420*a*) among the plurality of output ends 420*a*, 420*b*, 420*c* and 420*d* under the control of the processor 320.

In an embodiment, the first switch 392*a* may be configured to connect an output end (e.g., the second output end 420*b*, the third output end 420*c*, or the fourth output end 420*d*) not connected to the input end 410 among the plurality of output ends 420*a*, 420*b*, 420*c* and 420*d* to a matching circuit 430 having a preset impedance value. For example, the first switch 392*a* may be configured to connect the first path 393*a* to a matching circuit having a preset impedance value when the first FEM 390*a* is connected to the first antenna 200*a*.

In an embodiment, the first switch 392*a* may be configured to connect the first antenna 200*a*, the second path 393*b* and the third path 393*c* to a matching circuit having a preset impedance value when the first FEM 390*a* is connected to the first path 393*a*.

The matching circuit 430 may be implemented with a passive element (e.g., a resistor, an inductor, or a capacitor) to have a preset impedance value.

The preset impedance value may refer to an impedance value set to efficiently eliminate the signal received through the antennas (e.g., the first antenna 200*a*, the second antenna 200*b*, the third antenna 200*c* and the fourth antenna 200*d*).

Figure 4B:
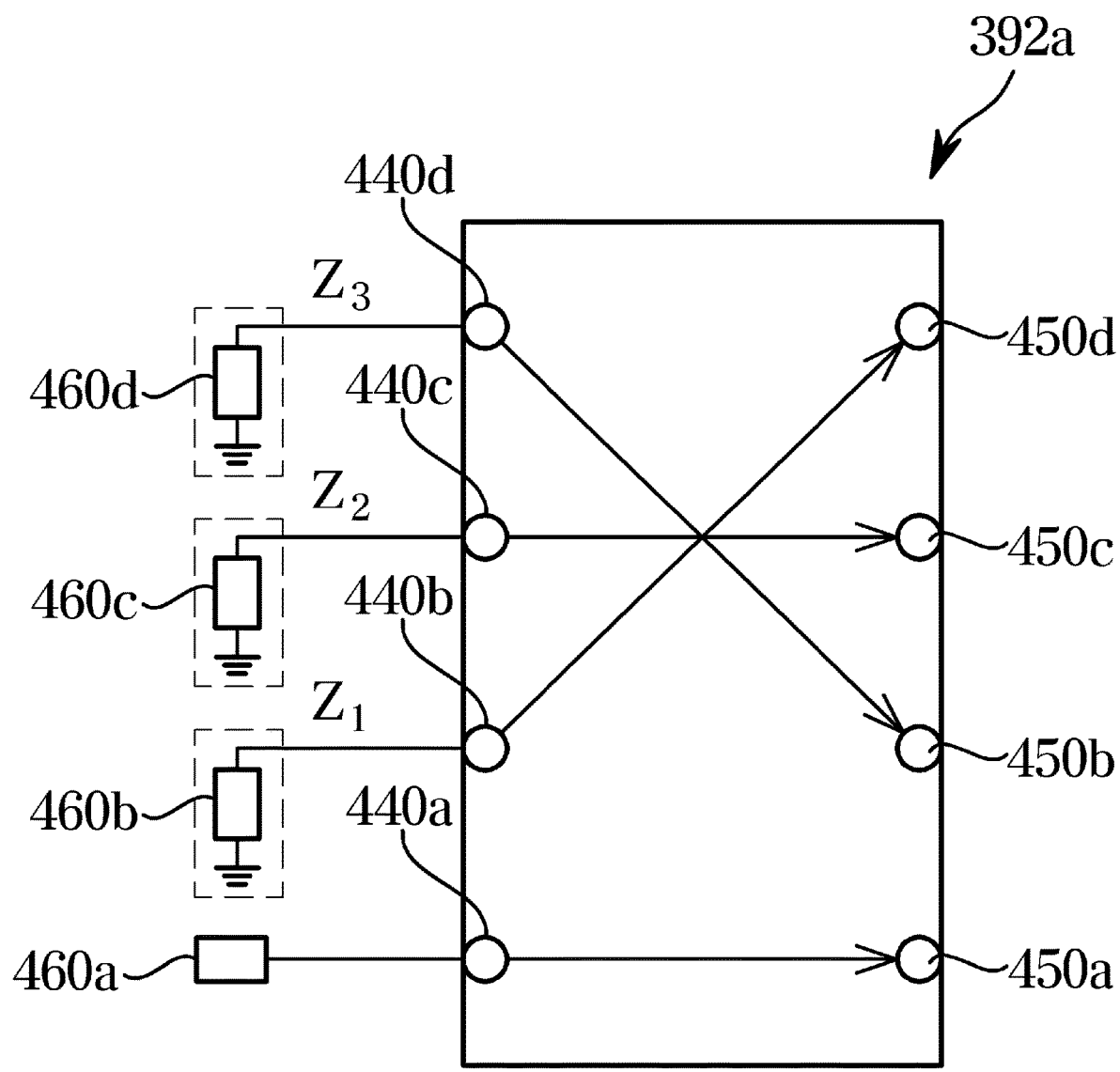
FIG. 4B is another example of a first switch of a communication module of an electronic device, according to various embodiments.

FIG. 4B is another example of the first switch 392*a* of a communication module of an electronic device, according to one or more embodiments.

Referring to FIG. 4B, in an embodiment, the first switch 392*a* may be implemented as the 4P4T switch.

The first switch 392*a* may include a plurality of input ends (e.g., a first input end 440*a*, a second input end 440*b*, a third input end 440*c* and a fourth input end 440*d*) and a plurality of output ends (e.g., a first output end 450*a*, a second output end 450*b*, a third output end 450*c* and a fourth output end 450*d*).

In an embodiment, the first input end 440*a* may be connected to an FEM 460*a* (e.g., the first FEM 390*a*), the second input end 440*b* to a first matching circuit 460*b*, a third input end 440*c* to a second matching circuit 460*c*, and the fourth input end 440*d* to a third matching circuit 460*d*.

In an embodiment, the first output end 450*a* may be connected to the first antenna 200*a*, the second output end 450*b* to the first path 393*a*, the third output end 450*c* to the second path 393*b*, and the fourth output end 450*d* to the third path 393*c*.

The first switch 392*a* may connect the plurality of input ends 440*a*, 440*b*, 440*c* and 440*d* to the plurality of output ends 450*a*, 450*b*, 450*c* and 450*d* selectively, under the control of the processor 320.

In an embodiment, the first switch 392*a* may connect the first input end 440*a* to the first output end 450*a*, the second input end 440*b* to the fourth output end 450*d*, the third input end 440*c* to the third output end 450*c*, and the fourth input end 440*d* to the second output end 450*b*.

As a result, the first switch 392*a* may connect the FEM 450*a*, the first matching circuit 460*b*, the second matching circuit 460*c* and the third matching circuit 460*d* to the first antenna 200*a*, the first path 393*a*, the second path 393*b*, and the third path 393*c*, selectively.

In an embodiment, at least two of impedance Z1 of the first matching circuit 460*b*, impedance Z2 of the second matching circuit 460*c*, impedance Z3 of the third matching circuit 460*d* may be different from each other. For example, the impedance Z1 of the first matching circuit 460*b* and the impedance Z2 of the second matching circuit 460*c* may be different from each other.

The impedance Z1 of the first matching circuit 460*b*, impedance Z2 of the second matching circuit 460*c*, and impedance Z3 of the third matching circuit 460*d* may be set in advance by a designer to efficiently eliminate signals received through the antennas (e.g., the first antenna 200*a*, the second antenna 200*b*, the third antenna 200*c* and the fourth antenna 200*d*).

In an embodiment, a lookup table related to optimal matching conditions depending on the state of the electronic device 101 may be stored in the memory 330.

In an embodiment, the processor 320 may determine a relation of connection of the first switch 392*a* based on the lookup table stored in the memory 330, and connect the plurality of input ends 440*a*, 440*b*, 440*c* and 440*d* to the plurality of output ends 450*a*, 450*b*, 450*c* and 450*d* based on the determined relation of connection.

Figure 5:
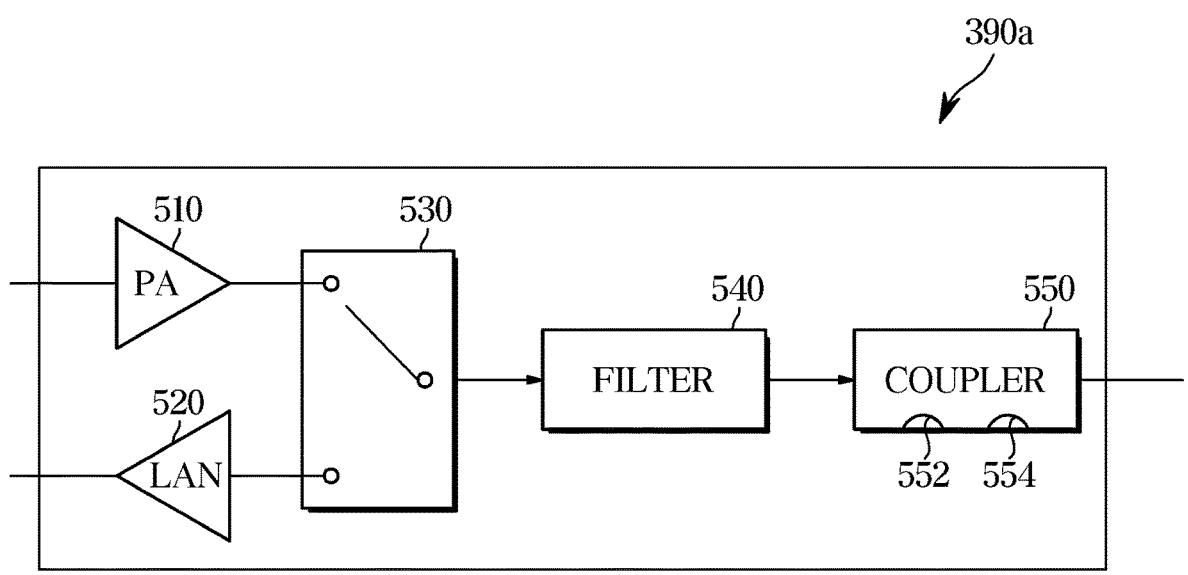
FIG. 5 is an example of a first front-end module of a communication module of an electronic device, according to various embodiments.

FIG. 5 is an example of a first FEM of a communication module of an electronic device, according to one or more embodiments.

Referring to FIG. 4, in an embodiment, the first FEM 390*a* may include a power amplifier (PA) 510, a low noise amplifier (LNA) 520, a switch 530 and/or a coupler 550.

The communication signal sent from the transceiver 390 may be amplified by the PA 510, filtered via the switch 530 by the filter 540 into a transmission band, and output to an antenna (e.g., the first antenna 200*a*, the second antenna 200*b*, the third antenna 200*c* or the fourth antenna 200*d*). A received signal provided from the first antenna 200*a* may be filtered by the filter 540 into a reception band, and amplified by the LNA 520 via the switch 530. In another embodiment, the LNA 520 may be omitted. When the LNA 520 is omitted, the transceiver 390 that receives a received signal may include an LNA. The coupler 550 may include a forward terminal 552 and/or a reverse terminal 554. The forward terminal 552 may be used to extract a signal sent from the filter 540 toward the antenna, and the reverse terminal 554 may be used to extract a signal sent from the antenna toward the filter 540.

Figure 6:
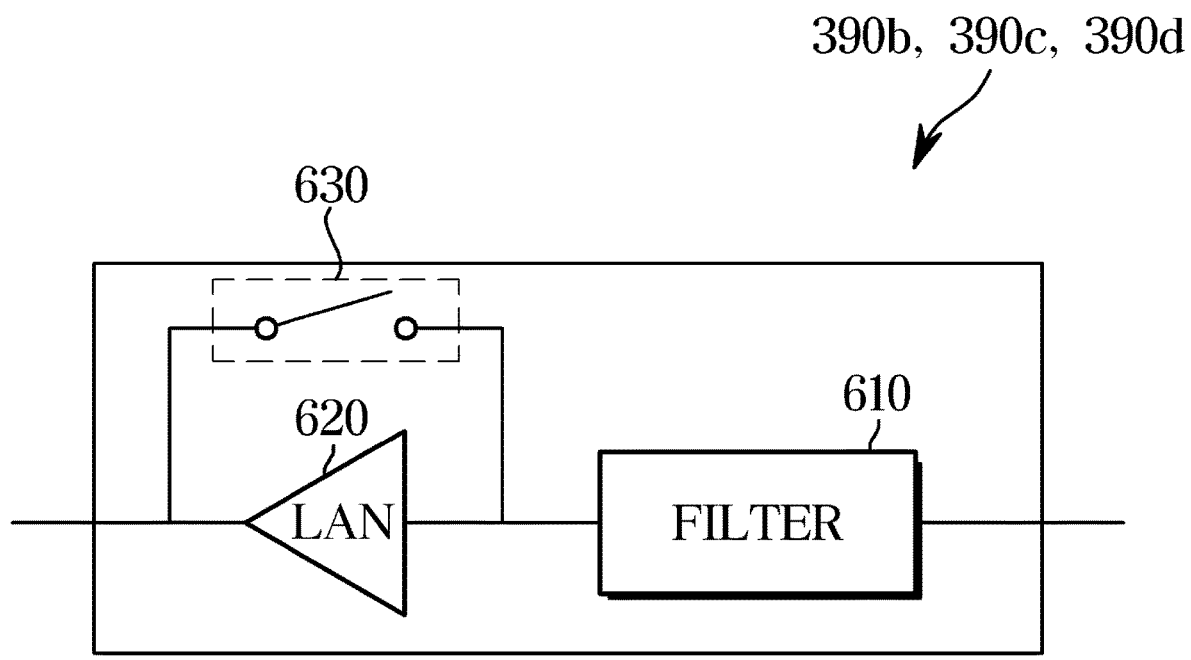
FIG. 6 is an example of second, third, and fourth front-end modules of a communication module of an electronic device, according to various embodiments.

FIG. 6 is an example of second, third, and fourth FEMs of a communication module of an electronic device, according to one or more embodiments.

Referring to FIG. 6, a receiving FEM (e.g., the second FEM 390*b*, the third FEM 390*c*, or the fourth FEM 390*d*) may include a filter 610, an LNA 620 and/or the bypass path 630. A received signal provided from the receive antenna (e.g., the second antenna 200*b*, the third antenna 200*c*, or the fourth antenna 200*d*) may be filtered by the filter 610, amplified by the LNA 620 or may pass the bypass path 630, and may then be sent to the transceiver 390.

Configurations of the electronic device 101 and/or configurations of the communication module 190 of the electronic device according to various embodiments have thus far been described.

An operation method of the electronic device 101 according to one or more embodiments to reduce radiated spurious emission (RSE) caused by coupling (or interference) between antennas (e.g., the first antenna 200*a*, the second antenna 200*b*, the third antenna 200*c* and the fourth antenna 200*d*) will now be described.

Figure 7:
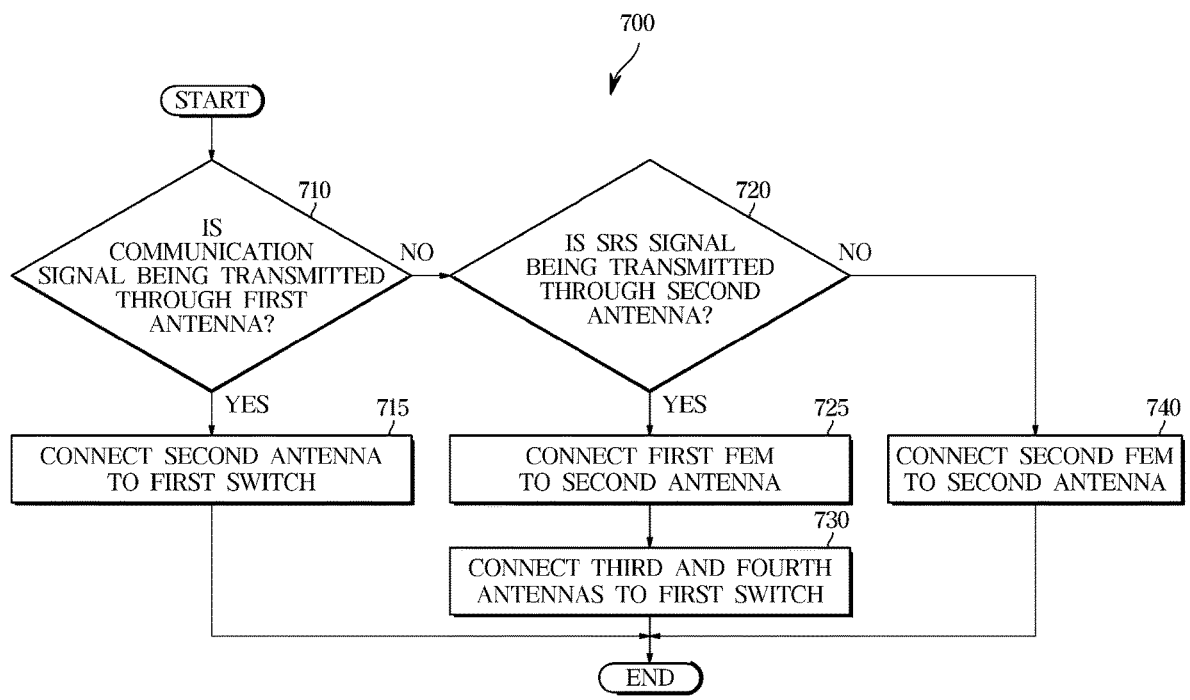
FIG. 7 is a flowchart for alteration of a receiving path of an antenna of an electronic device, according to an embodiment.
Figure 8:
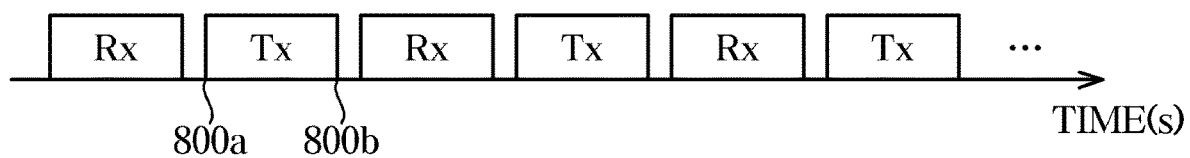
FIG. 8 is a diagram for a time division duplexing communication scheme, according to one or more embodiments.

FIG. 7 is a flowchart for describing alteration of a receiving path of an antenna of an electronic device, according to one or more embodiments, and FIG. 8 is a diagram for describing a time division duplexing communication scheme, according to one or more embodiments.

The processor 320 may control the first switch 392*a* to connect the first FEM 390*a* to the first antenna 200*a* for performing communication between the electronic device 101 and an external electronic device (e.g., the electronic device 102, the electronic device 104, or the server 108).

In an embodiment, the electronic device 101 may employ a time division duplexing (TDD) scheme to communicate with the external electronic device.

Referring to FIG. 8, the electronic device 101 may communicate with an external electronic device by repeating transmission and reception of communication signals at preset time intervals.

Referring to a flowchart 700 of FIG. 7, in a case of transmitting a communication signal through the first antenna 200*a* (e.g., from 800*a* to 800*b* of FIG. 8) in 710, the processor 320 may control the second switch 392*b* to connect the second antenna 200*b* to the first path 393*a*. For example, the processor 320 may control the first switch 392*a* to connect the first FEM 390*a* to the first antenna 200*a* and control the second switch 392*b* to connect the second antenna 200*b* to the first path 393*a*.

In an embodiment, the processor 320 may control the third switch 392*c* to connect the third antenna 200*c* to the second path 393*b* in a case of transmitting a communication signal through the first antenna 200*a*. Furthermore, the processor 320 may control the fourth switch 392*d* to connect the fourth antenna 200*d* to the third path 393*c* in a case of transmitting a communication signal through the first antenna 200*a*.

In an embodiment, in a case of transmitting a communication signal through a transmit antenna (e.g., the first antenna 200*a*), a signal induced to a receive antenna (e.g., the second antenna 200*b*, the third antenna 200*c* or the fourth antenna 200*d*) adjacent to the transmit antenna may be sent to the matching circuit 430 in the first switch 392*a*.

According to a traditional technology, as long as the SRS is not transmitted through receive antennas (e.g., the second antenna 200*b*, the third antenna 200*c* and the fourth antenna 200*d*), the second switch 392*b* may connect the second antenna 200*b* to the second FEM 390*b*, the third switch 392*c* may connect the third antenna 200*c* to the third FEM 390*c*, and the fourth switch 392*d* may connect the fourth antenna 200*d* to the fourth FEM 390*d*, thereby causing an RSE issue.

In various embodiments, even when the communication signal output from the transmit antenna (e.g., the first antenna 200*a*) is induced to an adjacent receive antenna (e.g., the second antenna 200*b*, the third antenna 200*c*, or the fourth antenna 200*d*), the signal induced to the receive antenna may be eliminated in the matching circuit 430 in the first switch 392*a* without being sent to the transceiver 390, thereby improving RSE values.

In an embodiment, when the communication signal is not transmitted through the first antenna 200*a* in 710 (e.g., in an RX section of FIG. 8) and an SRS function is not operated in 720, the processor 320 may control the second switch 392*b* to connect the second antenna 200*b* to the second FEM 390*b* in 740. For example, when all the plurality of antennas (e.g., the first antenna 200*a*, the second antenna 200*b*, the third antenna 200*c*, and the fourth antenna 200*d*) are not transmitting a signal, the processor 320 may connect the receive antennas (e.g., the second antenna 200*b*, the third antenna 200*c*, and the fourth antenna 200*d*) to corresponding FEMs (e.g., the second FEM 390*b*, the third FEM 390*c* and the third FEM 390*c*).

In an embodiment, the processor 320 may control the third switch 392*c* to connect the third antenna 200*c* to the third FEM 390*c* while not transmitting a communication signal through the first antenna 200*a*. Furthermore, the processor 320 may control the fourth switch 392*d* to connect the fourth antenna 200*d* to the fourth FEM 390*d* while not transmitting a communication signal through the first antenna 200*a*.

In one or more embodiments, when there is no risk of inducing a signal to the receive antenna (e.g., the second antenna 200*b*, the third antenna 200*c* or the fourth antenna 200*d*), communication performance may be improved by connecting signal receiving paths of the receive antenna to the respective receiving FEMs (e.g., the second FEM 390*b* and the third FEM 390*c*).

Figure 9:
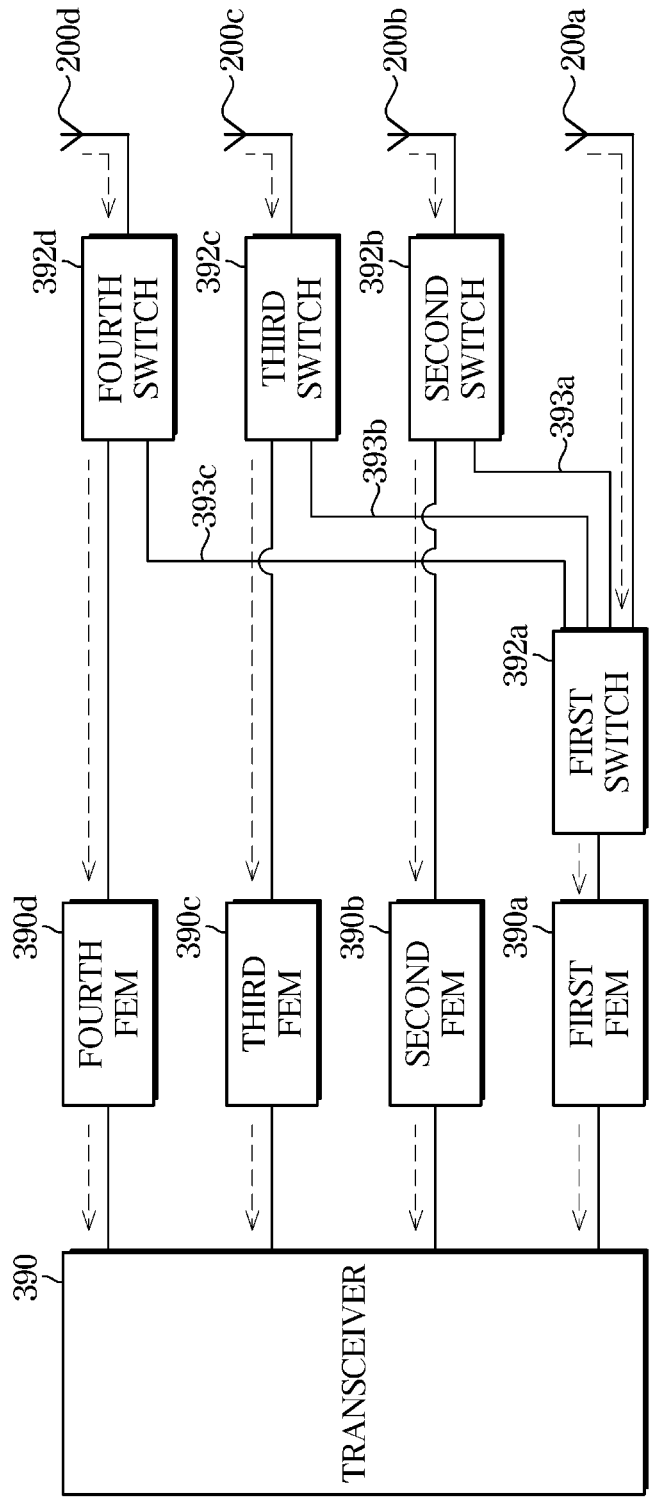
FIG. 9 is a diagram for a receiving path of a receive antenna while a first antenna of an electronic device is not transmitting a communication signal, according to one or more embodiments.
Figure 10:
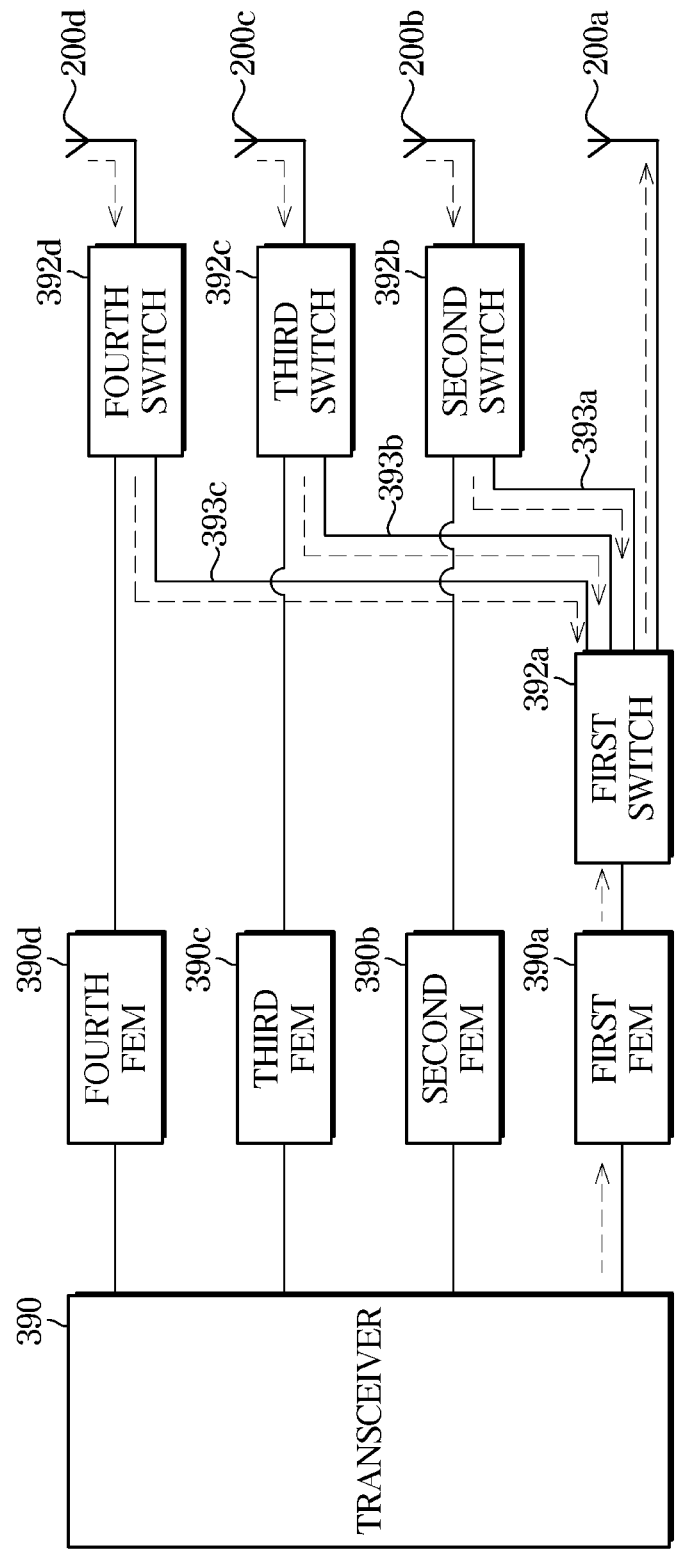
FIG. 10 is a diagram for a receiving path of a receive antenna while a first antenna of an electronic device is transmitting a communication signal, according to one or more embodiments.

FIG. 9 is a diagram for describing a receiving path of a receive antenna while a first antenna of an electronic device is not transmitting a communication signal, according to one or more embodiments, and FIG. 10 is a diagram for describing a receiving path of a receive antenna while a first antenna of an electronic device is transmitting a communication signal, according to one or more embodiments.

Referring to FIG. 9, when the first antenna 200a is not transmitting a communication signal, a signal received through the second antenna 200b may be sent to the second FEM 390b, a signal received through the third antenna 200c may be sent to the third FEM 390c, and a signal received through the fourth antenna 200d may be sent to the fourth FEM 390d.

In an embodiment, the state in which the first antenna 200a is not transmitting a communication signal may include a state in which the switch 530 of the first FEM 390a connects the filter 540 to the LNA 520. Furthermore, the state in which the first antenna is not transmitting a communication signal may include a state in which the communication signal is not output through the transceiver 390 even when the switch 530 of the first FEM 390a connects the filter 540 to the PA 510.

FIG. 10 is a diagram for describing a receiving path of a receive antenna while the first antenna 200a of an electronic device is transmitting a communication signal, according to one or more embodiments.

Referring to FIG. 10, when the first antenna 200a is transmitting a communication signal, a signal received through the second antenna 200b may be sent to the first path 393a, a signal received through the third antenna 200c may be sent to the second path 393b, and a signal received through the fourth antenna 200d may be sent to the third path 393c.

In an embodiment, each of the first path 393a, the second path 393b and/or the third path 393c may be connected to the matching circuit 430 having a preset impedance value provided in the first switch 392a. Accordingly, in an embodiment, when the first antenna 200a is transmitting a communication signal, a signal output from the first antenna 200a and induced to the second antenna 200b may be eliminated by the matching circuit 340 connected to the first path 393a; a signal output from the first antenna 200a and induced to the third antenna 200c may be eliminated by the matching circuit 340 connected to the second path 393b; a signal output from the first antenna 200a and induced to the fourth antenna 200d may be eliminated by the matching circuit 340 connected to the third path 393c.

In one or more embodiments, when the first switch 392a is implemented as a 4P4T, each of the first path 393a, the second path 393b and/or the third path 393c may be selectively connected to the first matching circuit 460b, the second matching circuit 460c and/or the third matching circuit 460d connected to the input ends 440b, 440c and 440d of the first switch 392a.

Accordingly, in an embodiment, when the first antenna 200a is transmitting a communication signal, a signal output from the first antenna 200a and induced to the second antenna 200b may be eliminated by the first matching circuit 460b connected to the first path 393a; a signal output from the first antenna 200a and induced to the third antenna 200c may be eliminated by the second matching circuit 460c connected to the second path 393b; a signal output from the first antenna 200a and induced to the fourth antenna 200d may be eliminated by the third matching circuit 460d connected to the third path 393c.

Turning back to FIG. 7, in an embodiment, when the SRS is transmitted through the second antenna 200b in 720, the processor 320 may control the first switch 392a and the second switch 392b to connect the first FEM 390a to the second antenna 200b, in 725.

Furthermore, in an embodiment, when the SRS is transmitted through the second antenna 200b, the processor 320 may control the third switch 392c to connect the third antenna 200c to the second path 393b, in 730.

In an embodiment, when the SRS is transmitted through the second antenna 200b, the processor 320 may control the fourth switch 392d to connect the fourth antenna 200d to the third path 393c, in 730.

In one or more embodiments, the SRS output from the receive antennas (e.g., the second antenna 200b, the third antenna 200c, and the fourth antenna 200d) may be prevented from being induced to the other antennas (e.g., the second antenna 200b, the third antenna 200c and the fourth antenna 200d).

Figure 11:
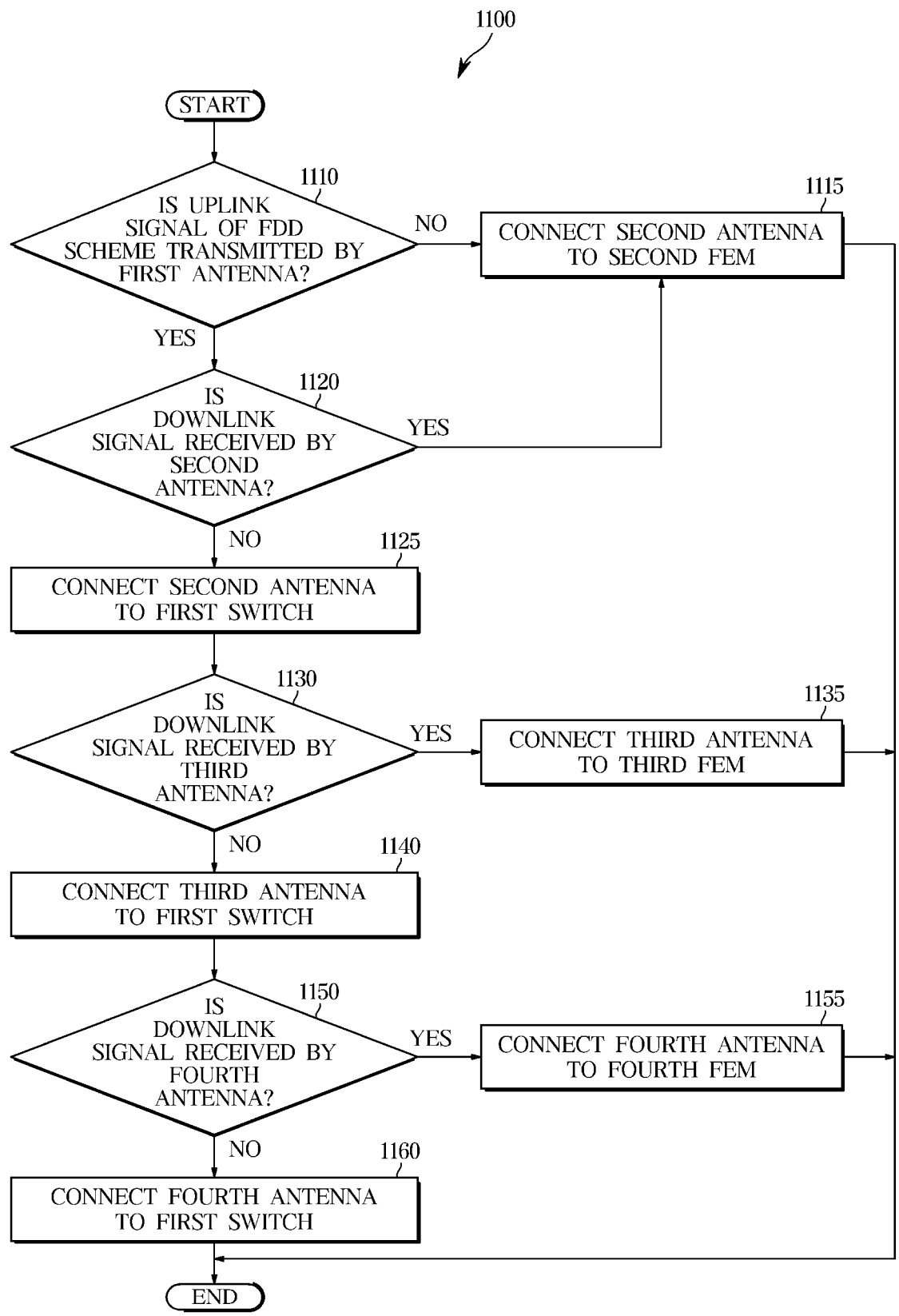
FIG. 11 is a flowchart for alteration of a receiving path of an antenna of an electronic device, according to one or more embodiments.
Figure 12:
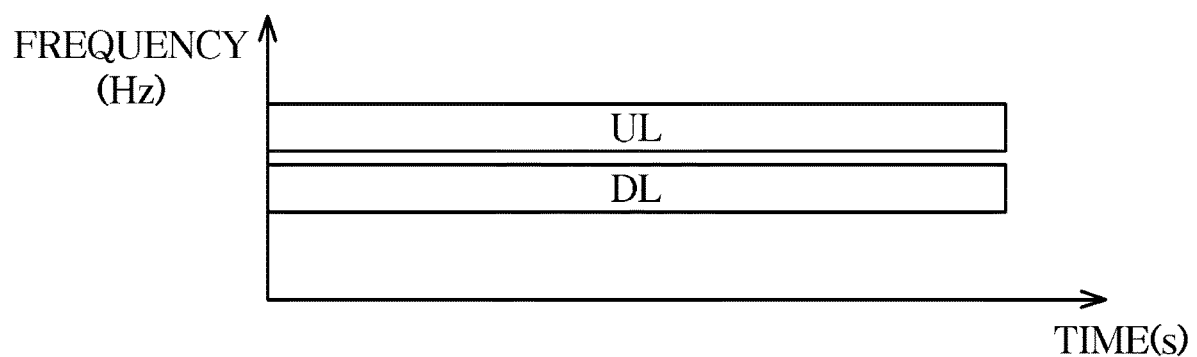
FIG. 12 is a diagram for a frequency division duplexing communication scheme, according to one or more embodiments.

FIG. 11 is a flowchart for describing alteration of a receiving path of an antenna of an electronic device, according to one or more embodiments, and FIG. 12 is a diagram for describing a frequency division duplexing communication scheme, according to one or more embodiments.

The processor 320 may control the first switch 392a to connect the first FEM 390a to the first antenna 200a for performing communication between the electronic device 101 and an external electronic device (e.g., the electronic device 102, the electronic device 104, or the server 108).

In an embodiment, the electronic device 101 may employ a frequency division duplexing (FDD) scheme to communicate with the external electronic device.

Referring to FIG. 12, the electronic device 101 may configure a pair of UL and DL communication channels by dividing frequencies, and simultaneously transmit and receive signals through the two channels (e.g., the UL and the DL).

In an embodiment, the electronic device 101 may transmit a UL signal to a target for communication (e.g., a BS), and simultaneously, receive a DL signal from the target for communication. The UL frequency band and the DL frequency band may be separated with a guard band in between.

In an embodiment, the electronic device 101 may transmit a UL signal through the first antenna 200a, and receive a DL signal through one of the receive antennas (e.g., the second antenna 200b, the third antenna 200c and the fourth antenna 200d).

Referring to a flowchart 1100 of FIG. 11, when a communication signal (e.g., a UL signal) is not transmitted through the first antenna 200a in 1110, the processor 320 may connect the receive antennas (e.g., the second antenna 200b, the third antenna 200c and the fourth antenna 200d) to corresponding FEMs (e.g., the second FEM 390b, the third FEM 390c and the fourth FEM 390d) as shown in FIG. 9, in 1115.

In an embodiment, when a UL signal is transmitted through the first antenna 200a in 1110, the processor 320 may connect a receive antenna (e.g., the second antenna 200b, the third antenna 200c or the fourth antenna 200d) that receives a DL signal corresponding to the UL signal to a corresponding FEM (e.g., the second FEM 390b, the third FEM 390c or the fourth FEM 390d).

In an embodiment, when the second antenna 200b is configured to receive the DL signal in 1120, the processor 320 may control the second switch 392b to connect the second antenna 200b to the second FEM 390b, in 1115.

When the second antenna 200b fails to receive the DL signal in 1120, the processor 320 may control the second switch 392b to connect the second antenna 200b to the first path 393a, in 1125.

Similarly, in an embodiment, when the third antenna 200c is configured to receive the DL signal in 1130, the processor 320 may control the third switch 392c to connect the third antenna 200c to the third FEM 390c, in 1135. Furthermore, when the third antenna fails to receive the DL signal in 1130, the processor 320 may control the third switch 392c to connect the third antenna 200c to the second path 393b, in 1140.

Similarly, in an embodiment, when the fourth antenna 200d is configured to receive the DL signal in 1150, the processor 320 may control the fourth switch 392d to connect the fourth antenna 200d to the fourth FEM 390d, in 1155. Furthermore, when the fourth antenna 200d fails to receive the DL signal in 1150, the processor 320 may control the fourth switch 392d to connect the fourth antenna 200d to the third path 393c, in 1160.

Figure 13:
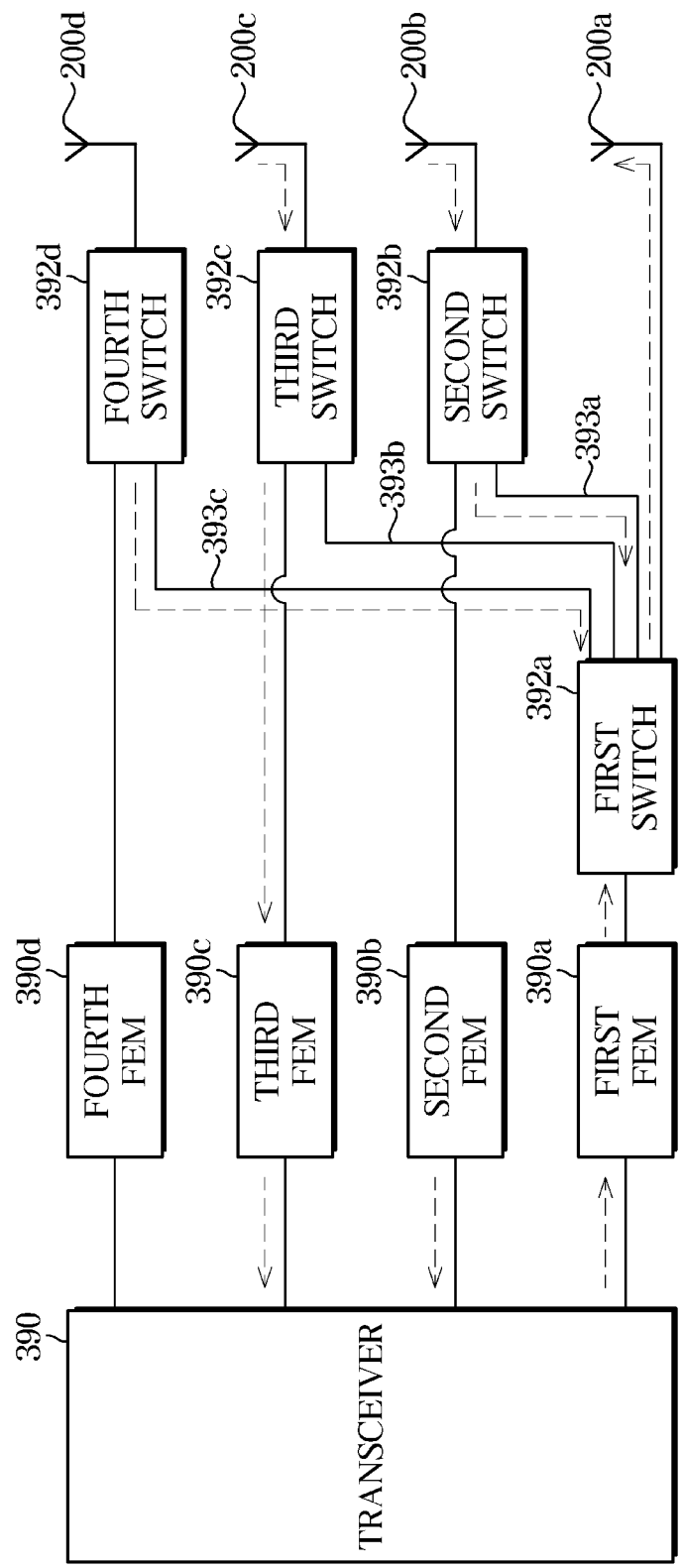
FIG. 13 is a diagram for a receiving path of a receive antenna while a first antenna of an electronic device is transmitting an uplink signal.

FIG. 13 is a diagram for describing a receiving path of a receive antenna while a first antenna of an electronic device is transmitting a UL signal.

Referring to FIG. 13, in an embodiment, when the third antenna 200c is configured to receive a DL signal, the processor 320 may control the second switch 392b to connect the second antenna 200b to the first path 393a, the third switch 392c to connect the third antenna 200c to the third FEM 390c, the fourth switch 392d to connect the fourth antenna 200d to the third path 393c.

In one or more embodiments, the electronic device 101 may connect only a receive antenna (e.g., the third antenna 200c) required for the FDD communication scheme to a corresponding FEM, thereby reducing the RSE.

Figure 14:
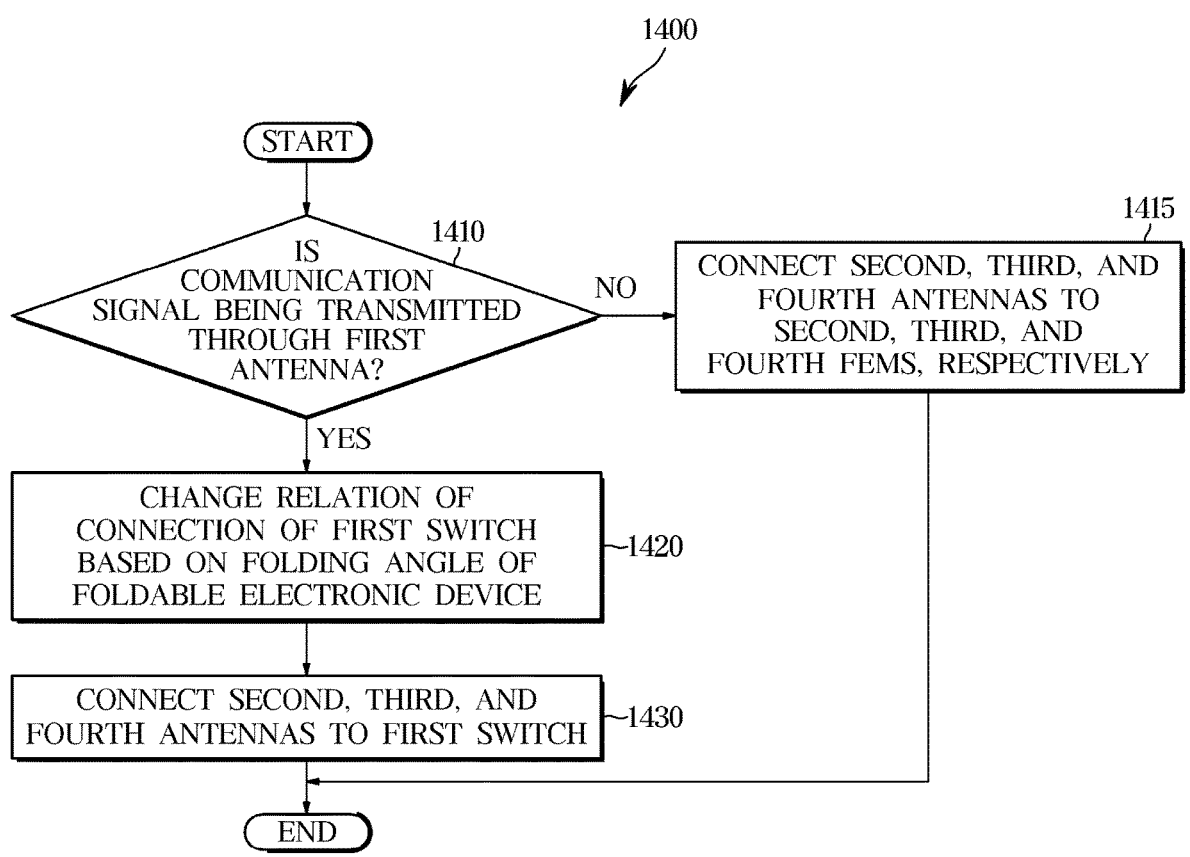
FIG. 14 is a flowchart for alteration of a receiving path of a receive antenna of a foldable electronic device, according to one or more embodiments.

FIG. 14 is a flowchart for describing alteration of a receiving path of a receive antenna of a foldable electronic device, according to one or more embodiments.

As described above, in an embodiment, the electronic device 101 may be implemented in a foldable structure. Furthermore, in an embodiment, the first switch 392a may be implemented as the 4P4T switch. Moreover, in an embodiment, the first switch 392a may be implemented as a switch having four or more input ends and four output ends.

In an embodiment, the first input end 440a, the second input end 440b, the third input end 440c and the fourth input end 440d of the first switch 392a may be connected to the first FEM 390a, the first matching circuit 460b, the second matching circuit 460c and the third matching circuit 460d, respectively, and the first output end 450a, the second output end 450b, the third output end 450c and the fourth output end 450d of the first switch 392a may be connected to the first antenna 200a, the first path 393a, the second path 393b and the third path 393c.

Furthermore, in an embodiment, when the first switch 392a is implemented as a switch having four or more input ends and four output ends, the plurality of input ends of the first switch 392a may be connected to at least one FEM and a plurality of matching circuits.

When the electronic device 101 that is implemented in a foldable structure (hereinafter, a foldable electronic device) is not transmitting a communication signal through the first antenna 200a in 1410, the processor 320 may control a plurality of switches (e.g., the second switch 392b, the third switch 392c and the fourth switch 392d) to connect the second antenna 200b, the third antenna 200c and the fourth antenna 200d to the second FEM 390b, the third FEM 390c and the fourth FEM 390d, respectively, in 1415.

In an embodiment, in a case of transmitting a communication signal through the first antenna 200a in 1410, the processor 320 may change the relation of connection of the first switch 392a based on the folding angle of the foldable electronic device 101.

In an embodiment, the processor 320 may obtain information about the folding angle of the foldable electronic device 101 from the sensor module 310.

In an embodiment, when a communication signal is transmitted through the first antenna 200a in 1410, the processor 320 may control the second switch 392b to connect the second antenna 200b to the first path 393a, the third switch 392c to connect the third antenna 200c to the second path 393b, the fourth switch 392d to connect the fourth antenna 200d to the third path 393c, in 1430.

As a result, when transmitting a communication signal through the first antenna 200a, the processor 320 may selectively connect the first matching circuit 460b, the second matching circuit 460c and the third matching circuit 460d to the first path 393a, the second path 393b and the third path 393c based on the folding angle of the foldable electronic device 101.

A relation of connection of the first switch 392a refers to a relation of connection between at least four input ends (e.g., the first input end 440a, the second input end 440b, the third input end 440c and the fourth input end 440d) and at least four output ends (e.g., the first output end 450a, the second output end 450b, the third output end 450c and the fourth output end 450d) of the first switch 392a.

In an embodiment, a lookup table related to optimal matching conditions depending on the folding angle of the foldable electronic device 101 may be stored in the memory 330.

For example, the memory 330 may store relations of connection of the first switch 392a corresponding to folding angles of the foldable electronic device 101.

Figure 15:
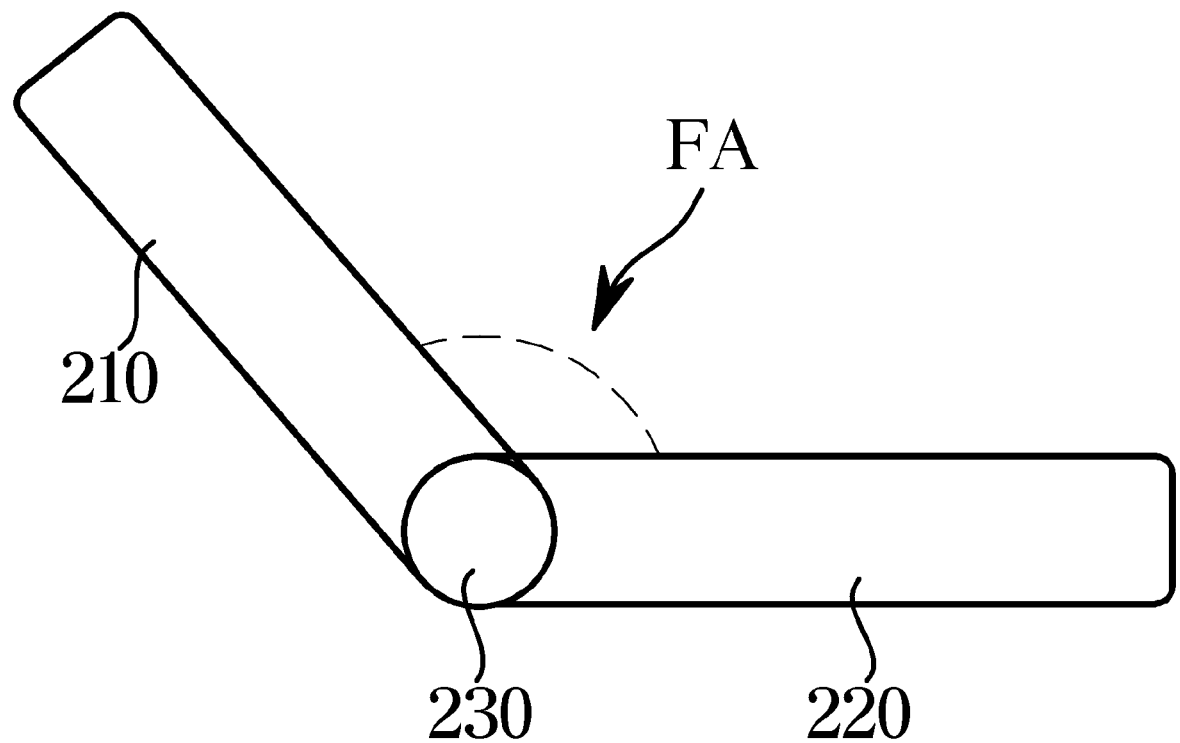
FIG. 15 is a diagram for an unfolded state of a foldable electronic device, according to one or more embodiments.
Figure 16:
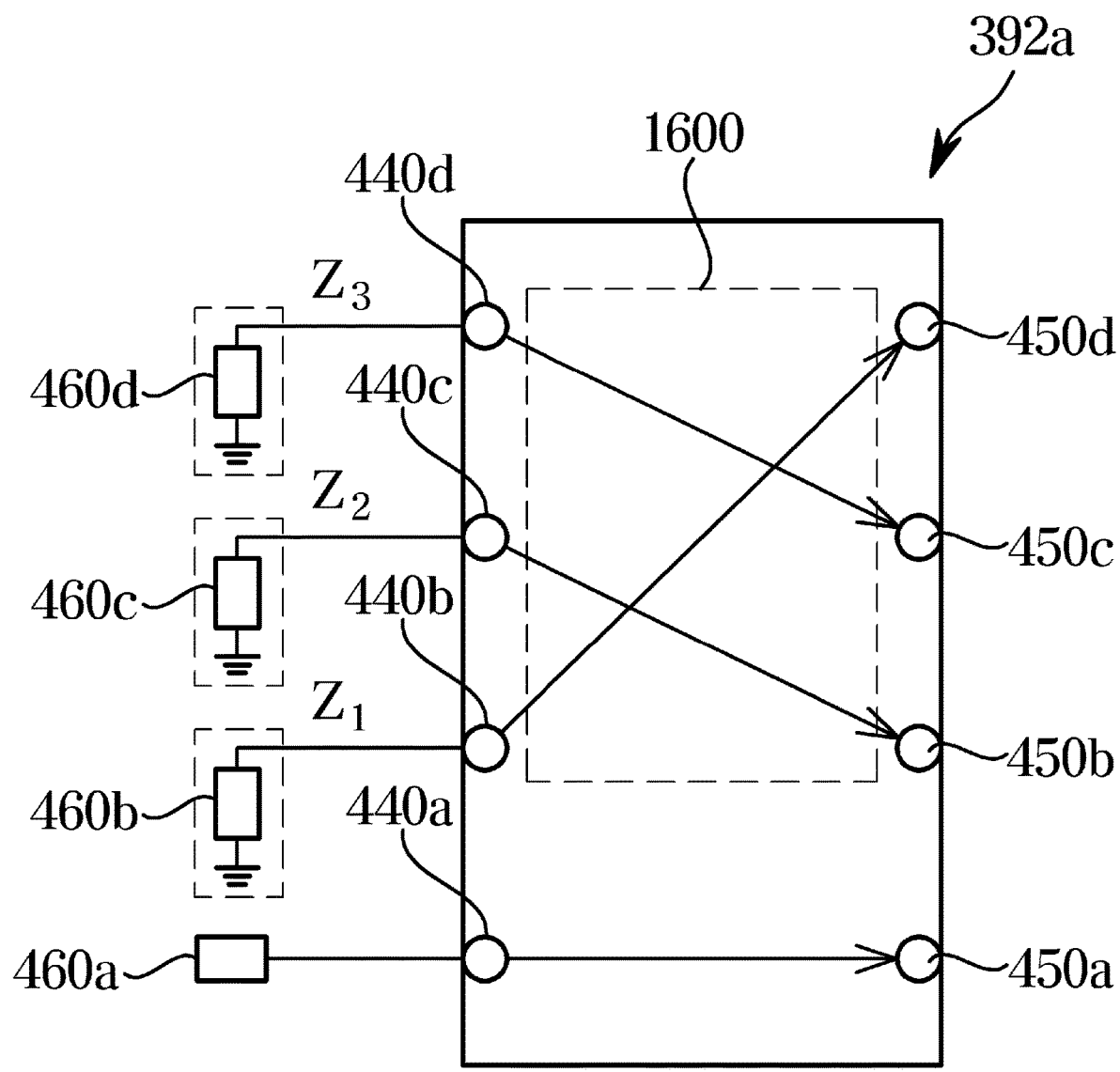
FIG. 16 is a diagram for a receiving path of a receive antenna in an unfolded state of a foldable electronic device, according to one or more embodiments.

FIG. 15 is a diagram for describing an unfolded state of a foldable electronic device, according to one or more embodiments, and FIG. 16 is a diagram for describing a receiving path of a receive antenna in an unfolded state of a foldable electronic device, according to one or more embodiments.

Referring to FIG. 15, as for the foldable electronic device 101, with a change in angle FA between the first housing structure 210 and the second housing structure 220 through the hinge mechanism in the hinge cover 230, distances between the antennas (e.g., the first antenna 200a, the second antenna 200b, the third antenna 200c and the fourth antenna 200d) may be changed. In an embodiment, when the folding angle FA of the foldable electronic device 101 increases, the distance between the first antenna 200a located at the upper end of the first housing structure 210 and the fourth antenna 200d located on a side surface of the second housing structure 220 increases, thereby reducing coupling between the first antenna 200a and the fourth antenna 200d.

In an embodiment, the processor 320 may change the relation of connection of the first switch 392a based on whether the folding angle FA of the foldable electronic device 101 is equal to or greater than a preset angle. The preset angle may be determined to have a critical value relevant to the magnitude of RSE.

In an embodiment, when the folding angle FA of the foldable electronic device 101 is equal to or greater than the preset angle, optimal matching conditions for minimizing RSE due to a signal induced to receive antennas (e.g., the second antenna 200b, the third antenna 200c and the fourth antenna 200d) are assumed to be as the following condition 1:

[Condition 1]
Second antenna 200b: second impedance Z2
Third antenna 200c: third impedance Z3

Fourth antenna 200d: first impedance Z1

Referring to FIG. 16, in an embodiment, when transmitting a communication signal through the first antenna 200a, the processor 320 may change a relation of connection 1600 of the first switch 392a according to the condition 1 when the folding angle FA of the foldable electronic device 101 is equal to or greater than the preset angle.

In an embodiment, the processor 320 may control the first switch 392a to connect the second input end 440b to the fourth output end 450a, the third input end 440c to the second output end 450b, and the fourth input end 440d to the third output end 450c, according to the condition 1.

Figure 17:
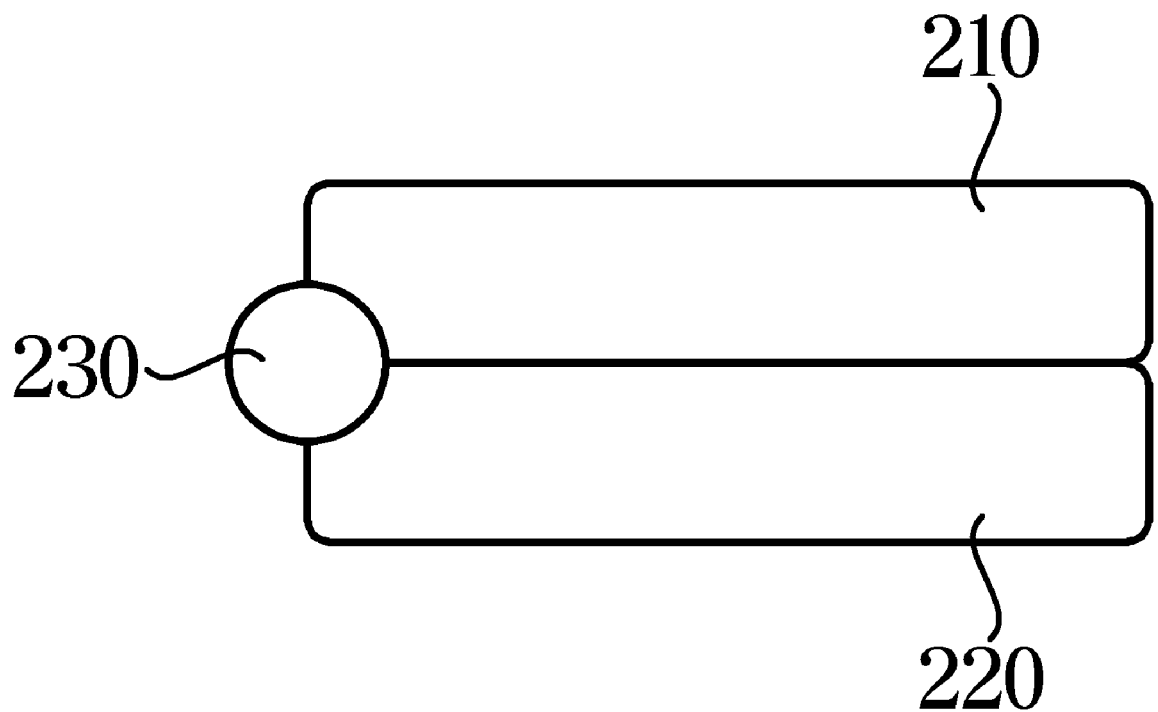
FIG. 17 is a diagram for a folded state of a foldable electronic device, according to an embodiment.
Figure 18:
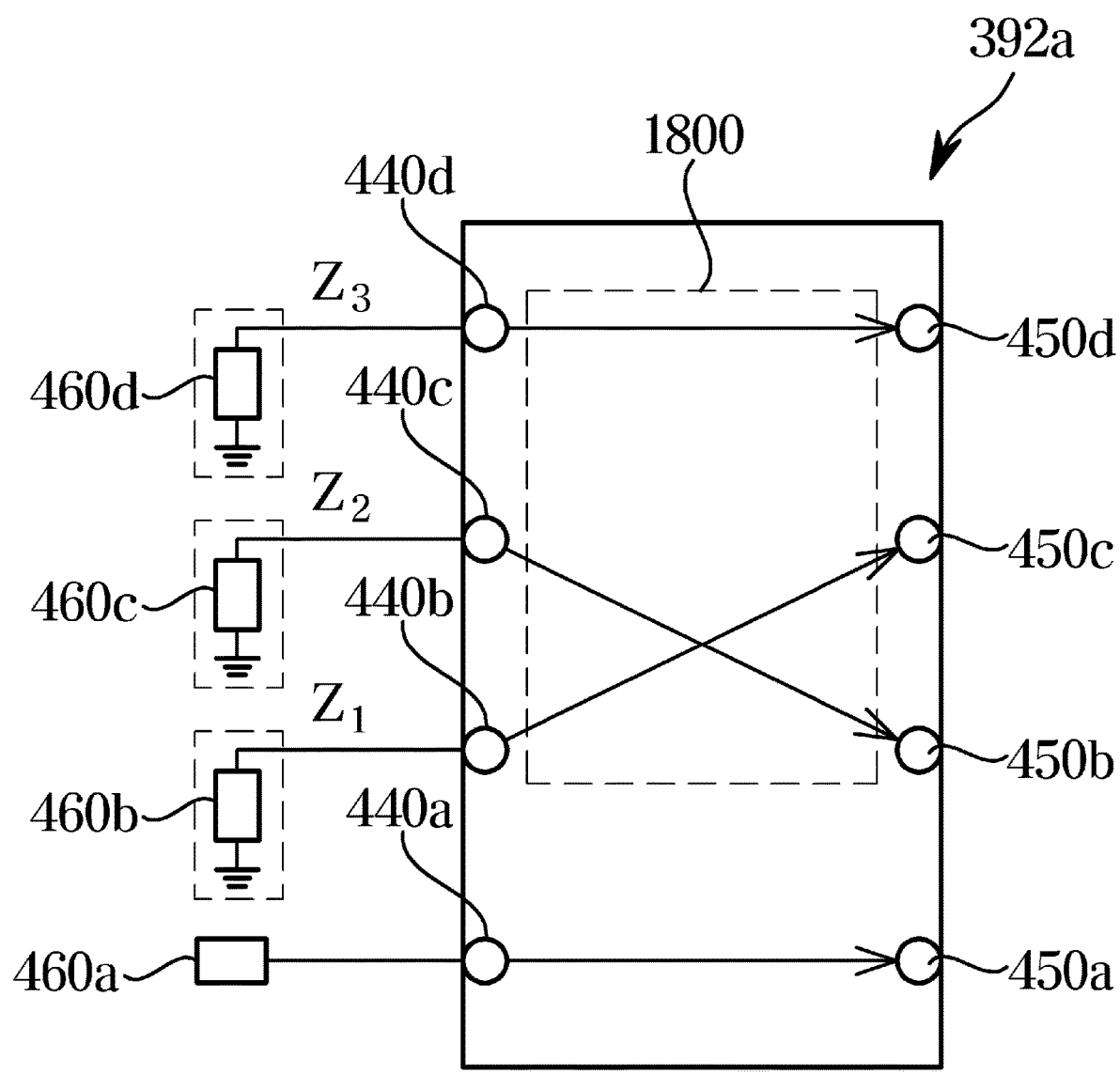
FIG. 18 is a diagram for a receiving path of a receive antenna in a folded state of a foldable electronic device, according to one or more embodiment.

FIG. 17 is a diagram for describing a folded state of a foldable electronic device, according to one or more embodiments, and FIG. 18 is a diagram for describing a receiving path of a receive antenna in a folded state of a foldable electronic device, according to one or more embodiments.

Referring to FIG. 17, in an embodiment, when the folding angle FA of the foldable electronic device 101 decreases, the distance between the first antenna 200a located at the upper end of the first housing structure 210 and the fourth antenna 200d located on a side surface of the second housing structure 220 decreases, thereby increasing coupling between the first antenna 200a and the fourth antenna 200d.

In an embodiment, when the folding angle FA of the foldable electronic device 101 is smaller than the preset angle, optimal matching conditions for minimizing RSE due to a signal induced to receive antennas (e.g., the second antenna 200b, the third antenna 200c and the fourth antenna 200d) are assumed to be as the following condition 2:

[Condition 2]

Second antenna 200b: second impedance Z2

Third antenna 200c: first impedance Z1

Fourth antenna 200d: third impedance Z3

Referring to FIG. 18, in an embodiment, when transmitting a communication signal through the first antenna 200a, the processor 320 may change a relation of connection 1800 of the first switch 392a according to the condition 2 when the folding angle FA of the foldable electronic device 101 is smaller than the preset angle.

In an embodiment, the processor 320 may control the first switch 392a to connect the second input end 440b to the third output end 450c, the third input end 440c to the second output end 450b, and the fourth input end 440d to the fourth output end 450d, according to the condition 2.

In one or more embodiments, signals induced to receive antennas may be minimized with optimal matching conditions depending on the folding angle FA of the foldable electronic device 101.

An electronic device according to various embodiments of the disclosure may include, for example, a portable communication device (e.g., a smartphone), a computer device, a portable multimedia device, a portable medical device, a camera, a wearable device, or a home appliance. The electronic device according to embodiments of the disclosure is not limited to the aforementioned devices.

It is understood that various embodiments of the disclosure and associated terms are not intended to limit technical features herein to particular embodiments, but encompass various changes, equivalents, or substitutions. Like reference numerals may be used for like or related elements throughout the drawings.

The singular form of a noun corresponding to an item may include one or more items unless the context states otherwise. Throughout the specification, "A or B", "at least one of A and B", "at least one of A or B", "A, B or C", "at least one of A, B and C", and "A, B, or C" may each include any one or all the possible combinations of A, B and C. Terms like "first", "second", etc., may be simply used to distinguish an element from another, without limiting the elements in a certain sense (e.g., in terms of importance or order). When an element is mentioned as being "coupled" or "connected" to another element with or without an adverb "functionally" or "operatively", it means that the element may be connected to the other element directly (e.g., wiredly), wirelessly, or through a third element.

In various embodiments of the disclosure, the term "module", "device", "member", or "block" may refer to a unit implemented in hardware, software, or firmware, and may be interchangeably used with e.g., logic, logic block, part, or circuit. The module may be an integral part that performs one or more functions, or a minimum unit or a portion of the part. For example, in an embodiment, the module may be configured with an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of a device (e.g., the electronic device 101) may call and execute at least one of the one or more instructions stored in the storage medium. This enables the device to be operated to perform at least one function according to at least one instruction called. The one or more instructions may include codes created by a compiler or codes that may be executed by an interpreter. The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily.

In an embodiment, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™) directly between two user devices (e.g., smart phones), or online (e.g., downloaded or uploaded). In the case of online distribution, at least part of the computer program product may be at least temporarily stored or arbitrarily created in a storage medium that may be readable to a device such as a server of the manufacturer, a server of the application store, or a relay server.

In various embodiments, each of the aforementioned components (e.g., a module or a program) may include a single entity or multiple entities, and some of the multiple entities may be separately arranged in another component. In various embodiments, one or more of the aforementioned components or operations may be omitted, or one or more of other components or operations may be added. Alternatively, or additionally, a plurality of components (e.g., modules or programs) may be integrated into a single component. In this case, the integrated component may perform one or more functions of the respective components therein equally or similarly to what are performed by the plurality of components before integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first antenna;
a second antenna;
a first front-end module configured to process a signal transmitted through the first antenna or the second antenna and process a signal received through the first antenna;
a second front-end module configured to process a signal received through the second antenna;
a first switch configured to connect the first front-end module to one of the first antenna or a first path;
a second switch configured to connect the second antenna to one of the second front-end module or the first path; and
a processor configured to, based on a communication signal being transmitted through the first antenna, control the first switch and the second switch to connect the first antenna to the first front-end module and connect the second antenna to the first path while the first switch connects the first antenna to the first front-end module.

2. The electronic device of claim 1, wherein the processor is further configured to, based on the communication signal not being transmitted through the first antenna, control the second switch to connect the second antenna to the second front-end module.

3. The electronic device of claim 1, further comprising:
a third antenna;
a third front-end module configured to process a signal received through the third antenna; and
a third switch configured to connect the third antenna to one of the third front-end module or a second path,
wherein the first switch is configured to connect the first front-end module to one of the first antenna, the first path or the second path, and
wherein the processor is further configured to, based on the communication signal being through the first antenna, control the third switch to connect the third antenna to the second path.

4. The electronic device of claim 3, wherein the processor is further configured to, based on a sounding reference signal (SRS) being transmitted through the second antenna, control the third switch to connect the third antenna to the second path.

5. The electronic device of claim 3, wherein the first switch is further selectively connected to the first front-end module, a first matching circuit and a second matching circuit to the first antenna, the first path and the second path, and
wherein the processor is further configured to, based on the communication signal being through the first antenna, control the first switch to connect the first path to the first matching circuit and connect the second path to the second matching circuit.

6. The electronic device of claim 5, wherein the first matching circuit and the second matching circuit are configured to have different impedance values.

7. The electronic device of claim 1, wherein the communication signal comprises an uplink signal in a frequency division duplexing (FDD) scheme,
wherein the electronic device further comprises:
a third antenna configured to receive a downlink signal corresponding to the uplink signal;
a third front-end module configured to process the downlink signal received through the third antenna; and
a third switch configured to connect the third antenna to one of the third front-end module or a second path,
wherein the first switch is configured to connect the first front-end module to one of the first antenna, the first path or the second path, and
wherein the processor is further configured to, based on the communication signal being transmitted through the first antenna, control the third switch to connect the third antenna to the third front-end module.

8. The electronic device of claim 1, wherein the first switch is further configured to, based on the first front-end module being connected to the first antenna, connect the first path to a matching circuit having a preset impedance value.

9. An operation method of an electronic device comprising a first antenna, a second antenna, a first front-end module configured to process a signal transmitted through the first antenna or the second antenna and process a signal received through the first antenna, and a second front-end module configured to process a signal received through the second antenna, a first switch configured to connect the first front-end module to one of the first antenna or a first path, and a second switch configured to connect the second antenna to one of the second front-end module or the first path, the operation method comprising:
controlling the first switch to connect the first front-end module to the first antenna;
transmitting a communication signal through the first antenna; and
based on the communication signal being transmitted through the first antenna, controlling the second switch to connect the second antenna to the first path while the first switch connects the first front-end module to the first antenna.

10. The operation method of claim 9, further comprising, based on the communication signal not being transmitted through the first antenna, controlling the second switch to connect the second antenna to the second front-end module.

11. The operation method of claim 9, wherein the electronic device further comprises a third antenna, a third front-end module configured to process a signal received through the third antenna, and a third switch configured to connect the third antenna to one of the third front-end module or a second path, and
wherein the operation method further comprises, based on the communication signal being transmitted through the first antenna, controlling the third switch to connect the third antenna to the second path.

12. The operation method of claim 11, further comprising:
based on a sounding reference signal (SRS) being transmitted through the second antenna, controlling the third switch to connect the third antenna to the second path.

13. The operation method of claim 11, further comprising, based on the communication signal being transmitted through the first antenna, controlling the first switch to connect the first path to a first matching circuit and connect the second path to a second matching circuit.

14. The operation method of claim 13, wherein the first matching circuit and the second matching circuit are configured to have different impedance values.

15. The operation method of claim 9, wherein the communication signal comprises an uplink signal in a frequency division duplexing (FDD) scheme,
wherein the electronic device further comprises a third antenna configured to receive a downlink signal corresponding to the uplink signal, a third front-end module configured to process the downlink signal received through the third antenna, and a third switch configured to connect the third antenna to one of the third front-end module or a second path, and wherein the operation method of the electronic device further comprises, based on the communication signal being transmitted through the first antenna, controlling the third switch to connect the third antenna to the third front-end module.

* * * * *